US010779605B2

(12) United States Patent
Beers et al.

(10) Patent No.: US 10,779,605 B2
(45) Date of Patent: Sep. 22, 2020

(54) ARTICLE OF FOOTWEAR AND A CHARGING SYSTEM FOR AN ARTICLE OF FOOTWEAR

(71) Applicant: NIKE, Inc., Beaverton, OR (US)

(72) Inventors: Tiffany A. Beers, Portland, OR (US); Andrew A. Owings, Portland, OR (US)

(73) Assignee: NIKE, Inc., Beaverton, OR (US)

(*) Notice: Subject to any disclaimer, the term of this patent is extended or adjusted under 35 U.S.C. 154(b) by 0 days.

(21) Appl. No.: 16/287,004

(22) Filed: Feb. 27, 2019

(65) Prior Publication Data

US 2019/0261725 A1    Aug. 29, 2019

Related U.S. Application Data

(63) Continuation of application No. 14/723,880, filed on May 28, 2015, now Pat. No. 10,231,505.

(51) Int. Cl.
| | | |
|---|---|---|
| H02J 7/00 | (2006.01) | |
| H02J 7/14 | (2006.01) | |
| A43B 3/00 | (2006.01) | |
| B65D 85/18 | (2006.01) | |
| H02J 7/02 | (2016.01) | |
| A43B 11/00 | (2006.01) | |
| A43B 23/07 | (2006.01) | |
| A43C 11/00 | (2006.01) | |
| A43C 11/16 | (2006.01) | |

(52) U.S. Cl.
CPC ............ *A43B 3/0005* (2013.01); *A43B 11/00* (2013.01); *A43B 23/07* (2013.01); *A43C 11/004* (2013.01); *A43C 11/165* (2013.01); *B65D 85/187* (2013.01); *H02J 7/025* (2013.01)

(58) Field of Classification Search
USPC .................. 320/107, 108, 109, 134, 136
See application file for complete search history.

(56) References Cited

U.S. PATENT DOCUMENTS

| | | |
|---|---|---|
| 4,466,204 A | 8/1984 | Wu |
| 4,848,009 A | 7/1989 | Rodgers |
| 5,592,759 A | 1/1997 | Cox |
| 5,765,300 A | 6/1998 | Kianka |

(Continued)

FOREIGN PATENT DOCUMENTS

| | | |
|---|---|---|
| CN | 101641027 A | 2/2010 |
| CN | 102892322 A | 1/2013 |

(Continued)

OTHER PUBLICATIONS

"U.S. Appl. No. 14/723,880, Examiner Interview Summary dated Sep. 14, 2018", 3 pgs.

(Continued)

*Primary Examiner* — Alexis B Pacheco
(74) *Attorney, Agent, or Firm* — Schwegman Lundberg & Woessner, P.A.

(57) ABSTRACT

A charging system can include provisions for providing power to various systems or components associated with the article of footwear. A charging system may include a charging device dimensioned to be used with one or more articles of footwear, where the articles of footwear can include different sizes. In some cases, the charging system can be used to facilitate the transfer of power to components in a motorized tensioning system.

20 Claims, 13 Drawing Sheets

(56) References Cited

U.S. PATENT DOCUMENTS

| | | |
|---|---|---|
| 6,691,433 B2 | 2/2004 | Liu |
| 6,788,200 B1 | 9/2004 | Jamel et al. |
| 7,210,253 B2 | 5/2007 | Yu |
| 7,225,565 B2 | 6/2007 | Dibenedetto et al. |
| 7,254,910 B2 | 8/2007 | Guzman |
| 7,596,891 B2 | 10/2009 | Carnes et al. |
| 7,607,243 B2 | 10/2009 | Berner et al. |
| 7,789,520 B2 | 9/2010 | Konig et al. |
| 7,794,101 B2 | 9/2010 | Galica et al. |
| 8,056,269 B2 | 11/2011 | Beers et al. |
| 8,058,837 B2 | 11/2011 | Beers et al. |
| 8,086,421 B2 | 12/2011 | Case, Jr. et al. |
| 8,234,798 B2 | 8/2012 | Dibenedetto |
| 8,384,551 B2 | 2/2013 | Ross et al. |
| 8,628,453 B2 | 1/2014 | Balakrishnan et al. |
| 8,729,737 B2 * | 5/2014 | Schatz ............... H01F 37/00 307/104 |
| 8,771,148 B2 | 7/2014 | Balakrishnan et al. |
| 8,879,685 B2 | 11/2014 | Oshio |
| 8,901,875 B2 * | 12/2014 | Schuessler ........... H01M 10/46 320/101 |
| 8,935,860 B2 | 1/2015 | Torres |
| 8,938,892 B2 | 1/2015 | Case, Jr. |
| 9,248,040 B2 | 2/2016 | Soderberg et al. |
| 9,812,890 B1 | 11/2017 | Leabman et al. |
| 10,231,505 B2 | 3/2019 | Beers et al. |
| 10,236,709 B2 * | 3/2019 | Decker ............... A61L 2/26 |
| 2003/0070324 A1 | 4/2003 | Nelson |
| 2005/0210710 A1 | 9/2005 | Chen |
| 2006/0156588 A1 | 7/2006 | Ferrell |
| 2007/0006489 A1 * | 1/2007 | Case, Jr. ............. A43B 3/0005 36/132 |
| 2007/0130804 A1 | 6/2007 | Levy et al. |
| 2008/0005935 A1 * | 1/2008 | Chyn ................ A43B 1/0036 36/137 |
| 2008/0197126 A1 * | 8/2008 | Bourke ............... A43B 7/025 219/634 |
| 2008/0203144 A1 | 8/2008 | Kim |
| 2009/0193689 A1 | 8/2009 | Galica et al. |
| 2009/0272013 A1 | 11/2009 | Beers et al. |
| 2009/0273311 A1 | 11/2009 | Beers et al. |
| 2010/0115799 A1 * | 5/2010 | Welter ............... A43B 3/0005 36/137 |
| 2010/0201312 A1 * | 8/2010 | Kirby ................ H02J 7/025 320/108 |
| 2010/0223816 A1 | 9/2010 | Barfield |
| 2011/0054359 A1 | 3/2011 | Sazonov et al. |
| 2011/0107771 A1 | 5/2011 | Crist et al. |
| 2011/0175744 A1 * | 7/2011 | Englert ............... A43B 1/0054 340/665 |
| 2011/0225843 A1 | 9/2011 | Kerns et al. |
| 2011/0260857 A1 * | 10/2011 | Hamill ............... A43B 17/00 340/539.13 |
| 2011/0266384 A1 | 11/2011 | Goodman et al. |
| 2012/0000091 A1 | 1/2012 | Cotterman et al. |
| 2012/0234111 A1 | 9/2012 | Molyneux et al. |
| 2013/0019503 A1 | 1/2013 | Vogt |
| 2013/0019694 A1 | 1/2013 | Molyneux et al. |
| 2013/0020986 A1 | 1/2013 | Linzon et al. |
| 2013/0104429 A1 | 5/2013 | Torres |
| 2013/0130843 A1 | 5/2013 | Burroughs et al. |
| 2013/0211290 A1 | 8/2013 | Lee |
| 2013/0219754 A1 | 8/2013 | Nowak et al. |
| 2014/0057233 A1 | 2/2014 | Morag et al. |
| 2014/0068838 A1 | 3/2014 | Beers et al. |
| 2014/0070042 A1 | 3/2014 | Beers et al. |
| 2014/0082963 A1 | 3/2014 | Beers |
| 2014/0094728 A1 | 4/2014 | Soderberg et al. |
| 2014/0130381 A1 * | 5/2014 | Jung .................. A43B 7/00 36/136 |
| 2014/0200834 A1 | 7/2014 | Ross |
| 2014/0228987 A1 | 8/2014 | Case, Jr. et al. |
| 2014/0244009 A1 | 8/2014 | Mestas |
| 2014/0249660 A1 | 9/2014 | Prstojevich |
| 2014/0260677 A1 * | 9/2014 | Dojan ................. G01L 1/2206 73/862.045 |
| 2014/0277632 A1 | 9/2014 | Walker |
| 2014/0330409 A1 | 11/2014 | Case, Jr. et al. |
| 2014/0358472 A1 | 12/2014 | Goel et al. |
| 2015/0015195 A1 * | 1/2015 | Leabman ............. H02J 50/10 320/108 |
| 2015/0059204 A1 | 3/2015 | Alexander et al. |
| 2015/0096204 A1 | 4/2015 | Case, Jr. |
| 2015/0104772 A1 | 4/2015 | Goel et al. |
| 2015/0255994 A1 | 9/2015 | Kesler et al. |
| 2015/0340904 A1 * | 11/2015 | Munson ............... A63B 43/00 320/108 |
| 2016/0345654 A1 | 12/2016 | Beers |
| 2017/0301462 A1 * | 10/2017 | Dela Cruz .......... H01F 27/2823 |
| 2018/0055175 A1 * | 3/2018 | Rho ................... H02J 7/342 |
| 2020/0221815 A1 | 7/2020 | Beers et al. |

FOREIGN PATENT DOCUMENTS

| | | |
|---|---|---|
| CN | 203735549 U | 7/2014 |
| CN | 204191702 U | 3/2015 |
| CN | 108471830 A | 8/2018 |
| EP | 2253238 A1 | 11/2010 |
| EP | 3302124 B1 | 12/2019 |
| FR | 3011411 A1 | 4/2015 |
| JP | 2002119498 A | 4/2002 |
| WO | WO-2016191121 A1 | 12/2016 |

OTHER PUBLICATIONS

"U.S. Appl. No. 14/723,880, Final Office Action dated Oct. 4, 2017", 19 pgs.

"U.S. Appl. No. 14/723,880, Non Final Office Action dated Feb. 23, 2017", 21 pgs.

"U.S. Appl. No. 14/723,880, Non Final Office Action dated May 18, 2018", 21 pgs.

"U.S. Appl. No. 14/723,880, Notice of Allowance dated Nov. 2, 2018", 9 pgs.

"U.S. Appl. No. 14/723,880, PTO Response to Rule 312 Communication dated Jan. 15, 2019", 2 pgs.

"U.S. Appl. No. 14/723,880, Response filed Sep. 17, 2018 to Non Final Office Action dated May 18, 2018", 11 pgs.

"Chinese Application Serial No. 201680044188.7, Voluntary Amendment filed Dec. 19, 2018", w/ English claims, 14 pgs.

"European Application Serial No. 16728769.7, Response filed Jul. 27, 2018 to Communication Pursuant to Rules 161 and 162 EPC dated Jan. 17, 2018", 38 pgs.

"International Application Serial No. PCT/US2016/032271, International Preliminary Report on Patentability dated Dec. 7, 2017", 13 pgs.

"International Application Serial No. PCT/US2016/032271, International Search Report dated Sep. 7, 2016", 5 pgs.

"International Application Serial No. PCT/US2016/032271, Written Opinion dated Sep. 7, 2016", 11 pgs.

"Chinese Application Serial No. 201680044188.7, Office Action dated Jun. 3, 2019", W/ English Summary, 7 pgs.

"Chinese Application Serial No. 201680044188.7, Office Action dated Mar. 2, 2020", w/o English Translation, 3 pgs.

"Chinese Application Serial No. 201680044188.7, Response filed Dec. 18, 2019 to Office Action dated Jun. 3, 2019", w English claims, 12 pgs.

"European Application Serial No. 19200511.4, Extended European Search Report dated Jan. 14, 2020", 7 pgs.

"U.S. Appl. No. 16/836,675, Non Final Office Action dated May 22, 2020", 17 pgs.

* cited by examiner

ARTICLE OF FOOTWEAR AND A CHARGING SYSTEM FOR AN ARTICLE OF FOOTWEAR

RELATED APPLICATIONS

This application is a continuation of U.S. patent application Ser. No. 14/723,880, filed May 28, 2015, which issued on Mar. 19, 2019 as U.S. Pat. No. 10,231,505, the content of which is incorporated herein by reference in its entirety.

BACKGROUND

The present embodiments relate generally to articles of footwear and including removable motorized adjustment systems.

Articles of footwear generally include two primary elements: an upper and a sole structure. The upper is often formed from a plurality of material elements (e.g., textiles, polymer sheet layers, foam layers, leather, synthetic leather) that are stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust the fit of the footwear, as well as permitting entry and removal of the foot from the void within the upper. Likewise, some articles of apparel may include various kinds of closure systems for adjusting the fit of the apparel.

SUMMARY

In one aspect, the present disclosure is directed to a charging system for articles of footwear, comprising a first charging device comprising an external inductive loop, a first article of footwear, and a second article of footwear. The first article of footwear includes a first sole structure and the second article of footwear includes a second sole structure, where the first sole structure comprises a first sole plate and a first midsole, and where the second sole structure comprises a second sole plate and a second midsole. Furthermore, the first midsole has a first size and the second midsole has a second size, and the first size is larger than the second size. In addition, the first sole plate includes a first cavity with a first component, and the second sole plate includes second cavity with a second component, where a volume of the first cavity is substantially similar to a volume of the second cavity. The first component includes a first internal inductive loop and the second component includes a second internal inductive loop, and the first charging device is configured to inductively charge the first article of footwear and the second article of footwear.

In another aspect, the present disclosure is directed to a charging system for an article of footwear, comprising a charging device, the charging device comprising a first portion and a second portion, where the first portion and the second portion are integrally joined. The first portion includes a first top surface and the second portion includes a second top surface, where the first top surface and the second top surface are substantially smooth. Furthermore, there is a first end associated with the first portion and a second end associated with the second portion. In addition, the first portion comprises a first thickness, the second portion comprises a second thickness, and the first thickness is less than the second thickness. The first end includes a substantially curved edge, and the second end includes a substantially linear edge. The first portion also includes an external inductive loop configured to generate an alternating magnetic field. The charging system further comprises a first article of footwear, the first article of footwear including a sole structure, the sole structure including an intermediate portion that is disposed along a midfoot region of the first article of footwear. The intermediate portion includes a first recessed region that facilitates alignment of the intermediate portion with the charging device, and the first portion of the charging device is configured to be snugly accommodated within the first recessed region of the first article of footwear.

In another aspect, the present disclosure is directed to a method of charging an article of footwear, comprising mounting a first article of footwear onto a charging device, where the first article of footwear has a first size, and aligning an exposed portion of a first sole plate associated with the first article of footwear with a first portion of the charging device. The method further includes charging the first article of footwear, removing the first article of footwear, and mounting a second article of footwear onto the charging device, where the second article of footwear has a second size different from the first size. In addition, the method includes aligning an exposed portion of a second sole plate associated with the second article of footwear with the first portion of the charging device, where the second sole plate is substantially similar in size to the first sole plate, and charging the second article of footwear.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
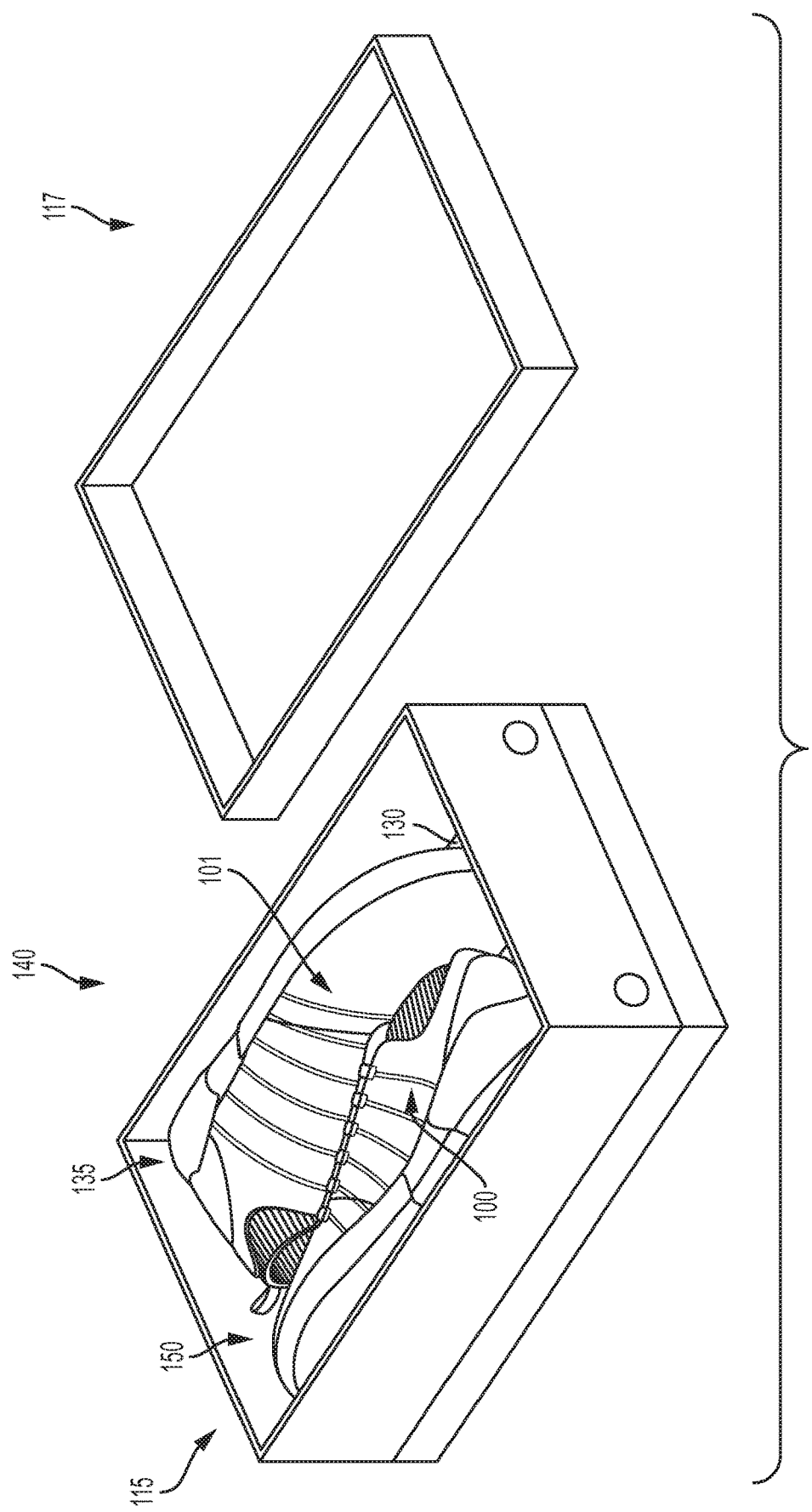
FIG. 1 is a schematic illustration of an embodiment of a kit of parts including a pair of footwear and a charging system.

The following discussion and accompanying figures disclose articles of footwear and a method of assembly of an article of footwear. Concepts associated with the footwear disclosed herein may be applied to a variety of athletic footwear types, including running shoes, basketball shoes, soccer shoes, baseball shoes, football shoes, and golf shoes, for example. Accordingly, the concepts disclosed herein apply to a wide variety of footwear types.

To assist and clarify the subsequent description of various embodiments, various terms are defined herein. Unless otherwise indicated, the following definitions apply throughout this specification (including the claims). For consistency and convenience, directional adjectives are employed throughout this detailed description corresponding to the illustrated embodiments.

The term "longitudinal," as used throughout this detailed description and in the claims, refers to a direction extending a length of a component. For example, a longitudinal direction of an article of footwear extends between a forefoot region and a heel region of the article of footwear. The term "forward" is used to refer to the general direction in which the toes of a foot point, and the term "rearward" is used to refer to the opposite direction, i.e., the direction in which the heel of the foot is facing.

The term "lateral direction," as used throughout this detailed description and in the claims, refers to a side-to-side direction extending a width of a component. In other words, the lateral direction may extend between a medial side and a lateral side of an article of footwear, with the lateral side of the article of footwear being the surface that faces away from the other foot, and the medial side being the surface that faces toward the other foot.

The term "side," as used in this specification and in the claims, refers to any portion of a component facing generally in a lateral, medial, forward, or rearward direction, as opposed to an upward or downward direction.

The term "vertical," as used throughout this detailed description and in the claims, refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" refers to the vertical direction heading away from a ground surface, while the term "downward" refers to the vertical direction heading towards the ground surface. Similarly, the terms "top," "upper," and other similar terms refer to the portion of an object substantially furthest from the ground in a vertical direction, and the terms "bottom," "lower," and other similar terms refer to the portion of an object substantially closest to the ground in a vertical direction.

The "interior" of a shoe refers to space that is occupied by a wearer's foot when the shoe is worn. The "inner side" of a panel or other shoe element refers to the face of that panel or element that is (or will be) oriented toward the shoe interior in a completed shoe. The "outer side" or "exterior" of an element refers to the face of that element that is (or will be) oriented away from the shoe interior in the completed shoe. In some cases, the inner side of an element may have other elements between that inner side and the interior in the completed shoe. Similarly, an outer side of an element may have other elements between that outer side and the space external to the completed shoe. Further, the terms "inward" and "inwardly" shall refer to the direction toward the interior of the shoe, and the terms "outward" and "outwardly" shall refer to the direction toward the exterior of the shoe.

For purposes of this disclosure, the foregoing directional terms, when used in reference to an article of footwear, shall refer to the article of footwear when sitting in an upright position, with the sole facing groundward, that is, as it would be positioned when worn by a wearer standing on a substantially level surface.

In addition, for purposes of this disclosure, the term "fixedly attached" shall refer to two components joined in a manner such that the components may not be readily separated (for example, without destroying one or both of the components). Exemplary modalities of fixed attachment may include joining with permanent adhesive, rivets, stitches, nails, staples, welding or other thermal bonding, or other joining techniques. In addition, two components may be "fixedly attached" by virtue of being integrally formed, for example, in a molding process.

For purposes of this disclosure, the term "removably attached" or "removably inserted" shall refer to the joining of two components or a component and an element in a manner such that the two components are secured together, but may be readily detached from one another. Examples of removable attachment mechanisms may include hook and loop fasteners, friction fit connections, interference fit connections, threaded connectors, cam-locking connectors, compression of one material with another, and other such readily detachable connectors.

Figure 2:
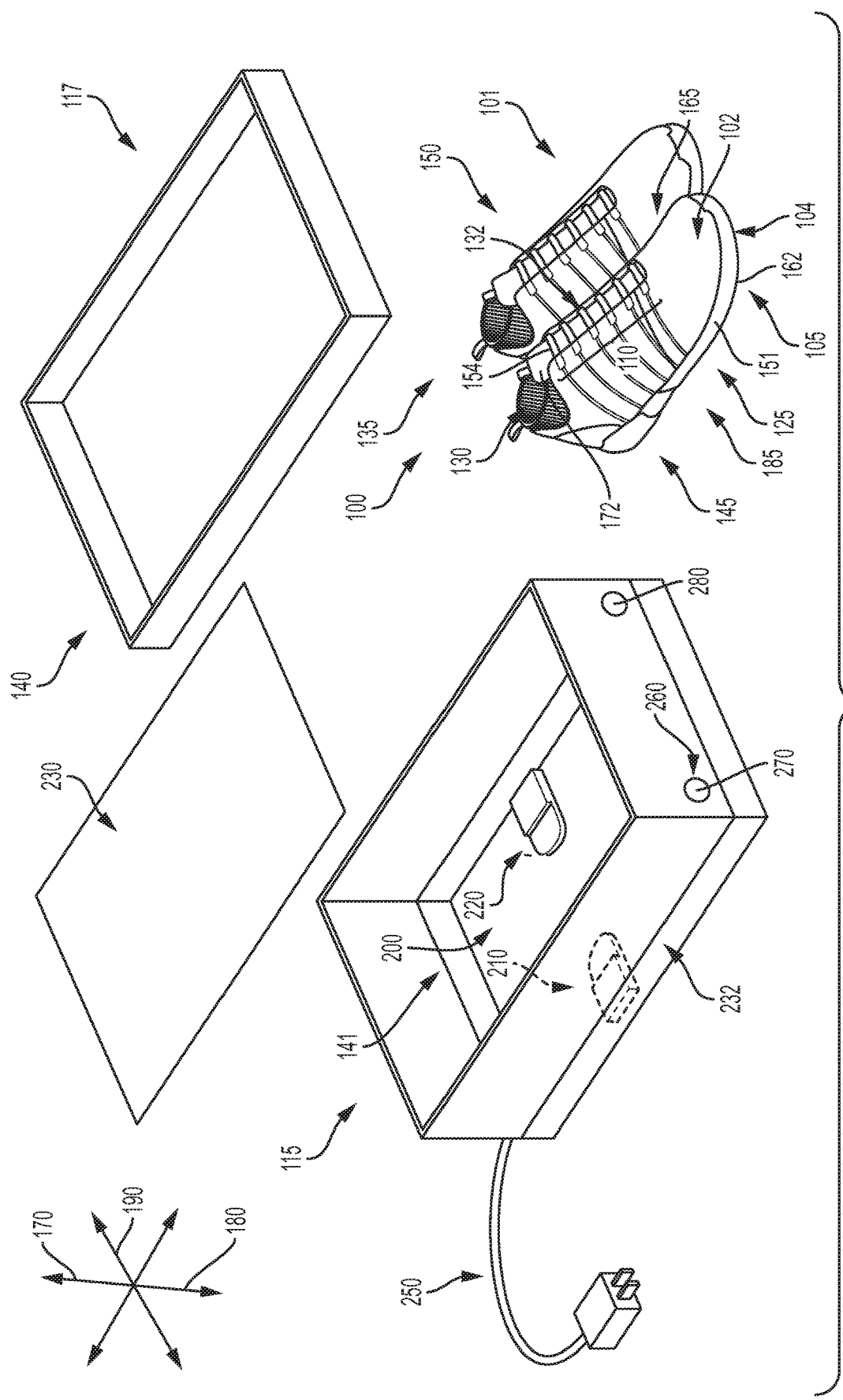
FIG. 2 is a schematic illustration of an embodiment of a kit of parts including a pair of footwear and a charging system.

FIGS. 1 and 2 illustrates a footwear charging system ("charging system") 140. As shown in FIG. 1, charging system 140 may be a kit of parts in some embodiments. The kit of parts may include a container 115 configured to store components of charging system 140. In different embodiments, charging system 140 may include a complementary pair of footwear ("pair") 135, comprising a first article of footwear ("first article") 100 and a second article of footwear ("second article") 101. For purposes of this discussion, a complementary pair of footwear refers to two articles of footwear which are designed to be worn as a pair by one user on a right foot and a left foot.

However, it should be understood that in other embodiments, the kit of parts comprising charging system 140 may be separate from pair of footwear 135. Thus, in some cases, charging system 140 may be manufactured or configured separately from pair of footwear 135. Furthermore, in some embodiments, charging system 140 may be utilized with a different pair of footwear.

Referring to FIG. 2, in some embodiments, charging system 140 may further include a first charging device ("first device") 210 and a second charging device ("second device") 220, which may collectively be referred to as a charging unit 200. Charging unit 200 will be described in greater detail with respect to FIGS. 3-6 below.

As shown in FIG. 2, container 115 may be configured to contain or store pair of footwear 135 and the pair of charging devices comprising charging unit 200. In some embodiments, container 115 may be a box, such as a traditional shoe box or plastic re-sealable container, with a cover or lid 117. For purposes of clarity, container 115 is illustrated here with a particular design. In FIGS. 1 and 2, container 115 is illustrated as a generally three-dimensional rectangular shoe box.

However, in other embodiments, container 115 can comprise any type of housing with the capacity for storing articles of footwear. For example, container 115 can comprise a bag which resembles a traditional duffle-type bag. Additionally, container 115 could be sized to fit a single pair of footwear, a single article of footwear, or multiple pairs of footwear, in different embodiments. In other embodiments, however, container 115 could have any other design. In particular, container 115 could have another shape and/or size in other embodiments. Examples of other designs for a container include, but are not limited to, any type of box, receptacle, housing, platform, bags and/or back packs. Furthermore, the container could include any provisions for carrying the container, including any type of strap or handle.

Furthermore, in embodiments including charging system 140, container 115 can include provisions for charging various systems or components associated with an article. In particular, in embodiments including an inductive charging system (see further below), container 115 can provide components of the inductive charging system that allow power to be transferred from an external power source to pair of footwear 135.

Referring to FIGS. 1 and 2, container 115 may include an interior portion 141 that is configured to receive one or more articles of footwear. In some embodiments, container 115 also includes floor portion that provides a floor or bottom for interior portion 141. Referring to the specific embodiment of FIG. 2, container 115 includes a base portion 232. In some cases, base portion 232 may be substantially flat. In other cases, base portion 232 may include curves or other irregularities along at least one surface. In different embodiments, base portion 232 may comprise recesses, bumps, protrusions, tabs, and/or other securing or receiving regions configured to help accommodate pair of footwear 135. With this arrangement, any articles placed within container 115 may rest upon base portion 232 in a substantially stable and steady manner.

Furthermore, container 115 may include at least one panel 130 in some embodiments. In some cases, panel 130 may be a movable panel or partition that is configured to open or be lifted in order to provide further access to interior portion 141 of container 115. In one embodiment, panel 130 may be adjusted within container 115 to provide additional access, and in other embodiments, panel 130 may be removed entirely from container 115. In some embodiments, pair 135 may be disposed or stored on top of a surface of panel 130 when charging system 140 is initially opened. However, in other embodiments, container 115 may not include panel 130.

In some embodiments, container 115 can include provisions for indicating the status of a charging system associated with container 115. In some cases, container 115 can include a visual indicator, such as a light, for indicating the charging status. In other cases, container 115 can include a sound-based indicator, such as a speaker configured to produce a sound to indicate the charging status. In the embodiment of FIG. 2, container 115 includes charging indicators 260, including a first light 262 and a second light 264. In particular, charging indicators 260 may be LED lights that are lit to indicate the charging status of an article of footwear. For example, if first article 100 is being charged alone, only first light 262 may be lit. In another embodiment, if both articles of pair 135 are being charged, both first light 262 and second light 264 may be lit. Furthermore, the color of one or both charging indicators 260 may change depending on the status of the charging system. In different embodiments, charging indicators 260 may be disposed along any portion (including the interior) of container 115 or charging unit 200. However, in other embodiments, there may be no charging indicators 260 included in charging system 140, or they may be disposed directly on an article.

As noted above, container 115 may include base portion 232 in some embodiments. In different embodiments, base portion 232 or other portions of container 115 can include one or more components of charging system 140. For example, in one embodiment, base portion 232 can include a charging station or charging dock disposed within base portion 232. In some cases, the charging station may include provisions for transferring power to one or more articles of footwear. In some embodiments, a charging station can include a central processing unit (CPU) of some kind. In other embodiments, a charging station could comprise a simple circuit of some kind for receiving electrical inputs and providing an electrical output according to the inputs. In one embodiment, a charging station may include a printed circuit board. Thus, in some cases, a charging station may include a number of ports that facilitate the input and output of information and power. The term "port" means any interface or shared boundary between two conductors for purposes of this disclosure. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards. However, in one embodiment, the charging station can include one or more ports configured to transfer power to an external inductive loop. It should be understood that the reference to an external inductive loop is with respect to an inductive loop that is external to an article of footwear. In other words, an external inductive loop may be enclosed. For example, an external inductive loop can be disposed within a portion of a charging device, or base portion 232, or some other portion of charging system 140. In some embodiments, each external inductive loop may be associated with an internal inductive loop of a corresponding article of footwear. Inductive-type ports may be readily moved from one place to another in some embodiments.

In some cases, base portion 232 can include one or more locating features to facilitate alignment of pair 135 within charging system 140. In particular, in embodiments using an inductive charging system, it may be necessary to ensure proper alignment of internal inductive loops disposed within each article with any external inductive loops disposed in container 115.

Thus, in different embodiments, base portion 232 can include various recessed portions (not shown here) that correspond with first article 100 and/or second article 101, respectively. In some cases, recessed portions may be shaped to fit the bottom surfaces of first article 100 and second article 101, respectively. This arrangement can help ensure proper alignment between pair 135 and charging system 140, which can facilitate efficient charging.

It should be understood that in other embodiments, other types of locating features may be used. For example, in some cases, base portion 232 can be configured with recesses that engage protrusions located on bottom surfaces of first article 100 and second article 101. In other cases, base portion 232 can be configured with protrusions that engage recesses located on bottom surfaces of first article 100 and second article 101. In still other embodiments, other types of locating features that are known in the art can be used. With these arrangements, each article can be maintained in a predetermined location with respect to base portion 232. In particular, first article 100 and second article 101 may be positioned in a manner that orients any internal inductive loops with any external inductive loops disposed within base portion 232.

In some embodiments, components of charging system 140 may be disposed below or adjacent to base portion 232. With this arrangement, one or more of the components of charging system 140 can be protected from the elements and from various types of contact with one or more articles of footwear. In other embodiments, however, one or more portions or components of charging system 140 may be exposed within interior portion 141, including charging unit 200, as will be discussed below.

Although the current embodiment generally describes an external inductive loop disposed adjacent or along base portion 232 of container 115, other embodiments can include external inductive loops disposed in other portions of the container. In other cases, for example, one or more external inductive loops can be disposed on interior side walls of the container. Furthermore, while the current embodiment includes internal inductive loops disposed in a sole structure of an article of footwear, in other embodiments an internal inductive loop could be disposed in any other portion of an article of footwear. Examples of other portions that could house an internal inductive loop include, but are not limited to, a tongue, an upper sidewall, a forefoot portion of an upper, a heel portion of an upper, as well as any other portion of an article of footwear. In some embodiments, the location of an internal inductive loop in an article of footwear can be selected according to the location of an external inductive loop in a container so that the internal inductive loop can be disposed adjacent to the external inductive loop when the article is inserted into container, allowing inductive coupling (i.e., charging in an inductive based charging system) to occur.

Furthermore, in some embodiments, container 115 of charging system 140 can also include provisions for receiving power from an external power source of some kind. In some embodiments, charging system can include a power cord 250 that is configured to receive power from an external power source. In one example, power cord 250 can be plugged into a wall socket. Power cord 250 can comprise a plug and cord in some embodiments. In one embodiment, power cord 250 may be configured for use in a wide range of environments. Thus, power cord 250 may be connected to a standard AC power source or outlet (i.e., sockets) in some embodiments. In one embodiment, power cord 250 may connect with a 110 volt power supply. In another embodiment, power cord 250 may be configured for utilization with a range of voltages, including 110, 115, 120, 220, 230 or other standard residential voltages, and/or DC power. In some cases, power cord 250 may be adapted for industrial voltage use. Thus, charging system 140 may be readily used in most of the locations where charging system 140 may be transported or used.

For purposes of description, only one article of pair of footwear 135 will be discussed in detail below. However, it should be understood that descriptions provided with reference to first article 100 may also be applicable to second article 101, including directional adjectives and the identification of general components (e.g., a sole structure and an upper) comprising each article. In other embodiments, it should be understood that first article 100 and second article 101 may include some differences in structure and/or design depending on the desired use or function of pair 136.

Referring to FIG. 2, in different embodiments, one or both articles comprising pair 135 may be configured with a tensioning system 150. In the current embodiment, first article 100 is shown in the form of an athletic shoe, such as a running shoe. However, in other embodiments, tensioning system 150 may be used with any other kind of footwear including, but not limited to: hiking boots, soccer shoes, football shoes, sneakers, running shoes, cross-training shoes, rugby shoes, basketball shoes, baseball shoes as well as other kinds of shoes. Moreover, in some embodiments, first article 100 may be configured for use with various kinds of non-sports related footwear, including, but not limited to: slippers, sandals, high heeled footwear, loafers as well as any other kinds of footwear. As discussed in further detail below, a tensioning system may not be limited to footwear and in other embodiments a tensioning system and/or components associated with a tensioning system could be used with various kinds of apparel, including clothing, sportswear, sporting equipment and other kinds of apparel. In still other embodiments, a tensioning system may be used with braces, such as medical braces.

As noted above, for consistency and convenience, directional adjectives are employed throughout this detailed description. First article 100 may be divided into three general regions along a longitudinal axis 180: a forefoot region 105, a midfoot region 125, and a heel region 145. Forefoot region 105 generally includes portions of first article 100 corresponding with the toes and the joints connecting the metatarsals with the phalanges. Midfoot region 125 generally includes portions of first article 100 corresponding with an arch area of the foot. Heel region 145 generally corresponds with rear portions of the foot, including the calcaneus bone. Forefoot region 105, midfoot region 125, and heel region 145 are not intended to demarcate precise areas of first article 100. Rather, forefoot region 105, midfoot region 125, and heel region 145 are intended to represent general relative areas of article 100 to aid in the following discussion. Since various features of first article 100 extend beyond one region of first article 100, the terms forefoot region 105, midfoot region 125, and heel region 145 apply not only to first article 100, but also to the various features of first article 100.

Referring to FIG. 2, for reference purposes, a lateral axis 190 of article 100, and any components related to first article 100, may extend between a medial side 165 and a lateral side 185 of the foot. Additionally, in some embodiments, longitudinal axis 180 may extend from forefoot region 105 to a heel region 145. It will be understood that each of these directional adjectives may also be applied to individual components of an article of footwear, such as an upper and/or a sole member. In addition, a vertical axis 170 refers to the axis perpendicular to a horizontal surface defined by longitudinal axis 180 and lateral axis 190.

First article 100 may include upper 102 and sole structure 104. Generally, upper 102 may be any type of upper. In particular, upper 102 may have any design, shape, size and/or color. For example, in embodiments where first article 100 is a basketball shoe, upper 102 could be a high top upper that is shaped to provide high support on an ankle. In embodiments where first article 100 is a running shoe, upper 102 could be a low top upper.

As shown in FIG. 2, upper 102 may include one or more material elements (for example, meshes, textiles, foam, leather, and synthetic leather), which may be joined to define an interior void configured to receive a foot of a wearer. The material elements may be selected and arranged to selectively impart properties such as light weight, durability, air-permeability, wear-resistance, flexibility, and comfort. Upper 102 may define an opening 130 through which a foot of a wearer may be received into the interior void.

At least a portion of sole structure 104 may be fixedly attached to upper 102 (for example, with adhesive, stitching, welding, or other suitable techniques) and may have a configuration that extends between upper 102 and the ground. Sole structure 104 may include provisions for attenuating ground reaction forces (that is, cushioning and stabilizing the foot during vertical and horizontal loading). In addition, sole structure 104 may be configured to provide traction, impart stability, and control or limit various foot motions, such as pronation, supination, or other motions.

In some embodiments, sole structure 104 may be configured to provide traction for first article 100. In addition to providing traction, sole structure 104 may attenuate ground reaction forces when compressed between the foot and the ground during walking, running or other ambulatory activities. The configuration of sole structure 104 may vary significantly in different embodiments to include a variety of conventional or non-conventional structures. In some cases, the configuration of sole structure 104 can be configured according to one or more types of ground surfaces on which sole structure 104 may be used.

For example, the disclosed concepts may be applicable to footwear configured for use on any of a variety of surfaces, including indoor surfaces or outdoor surfaces. The configuration of sole structure 104 may vary based on the properties and conditions of the surfaces on which first article 100 is anticipated to be used. For example, sole structure 104 may vary depending on whether the surface is harder or softer. In addition, sole structure 104 may be tailored for use in wet or dry conditions.

In some embodiments, sole structure 104 may be configured for a particularly specialized surface or condition. The proposed footwear upper construction may be applicable to any kind of footwear, such as basketball, soccer, football, and other athletic activities. Accordingly, in some embodiments, sole structure 104 may be configured to provide traction and stability on hard indoor surfaces (such as hardwood), soft, natural turf surfaces, or on hard, artificial turf surfaces. In some embodiments, sole structure 104 may be configured for use on multiple different surfaces.

As will be discussed further below, in different embodiments, sole structure 104 may include different components. For example, sole structure 104 may include an outsole, a midsole, a cushioning layer, and/or an insole. In addition, in some cases, sole structure 104 can include one or more cleat members or traction elements that are configured to increase traction with a ground surface.

In some embodiments, sole structure 104 may include multiple components, which may individually or collectively provide first article 100 with a number of attributes, such as support, rigidity, flexibility, stability, cushioning, comfort, reduced weight, or other attributes. In some embodiments, sole structure 104 may include an insole/sockliner, a midsole 151, and a ground-contacting outer sole member ("outsole") 162, which may have an exposed, ground-contacting lower surface. In some cases, however, one or more of these components may be omitted. In on embodiment, sole structure 104 may comprise a sole plate, as will be further discussed below.

Furthermore, in some embodiments, an insole may be disposed in the void defined by upper 102. The insole may extend through each of forefoot region 105, midfoot region 125, and heel region 145, and between lateral side 185 and medial side 165 of first article 100. The insole may be formed of a deformable (for example, compressible) material, such as polyurethane foams, or other polymer foam materials. Accordingly, the insole may, by virtue of its compressibility, provide cushioning, and may also conform to the foot in order to provide comfort, support, and stability.

Midsole 151 may be fixedly attached to a lower area of upper 102 (for example, through stitching, adhesive bonding, thermal bonding (such as welding), or other techniques), or may be integral with upper 102. Midsole 151 may be formed from any suitable material having the properties described above, according to the activity for which first article 100 is intended. In some embodiments, midsole 160 may include a foamed polymer material, such as polyurethane (PU), ethyl vinyl acetate (EVA), or any other suitable material that operates to attenuate ground reaction forces as sole structure 104 contacts the ground during walking, running, or other ambulatory activities.

Midsole 151 may extend through each of forefoot region 105, midfoot region 125, and heel region 145, and between lateral side 185 and medial side 165 of first article 100. In some embodiments, portions of midsole 151 may be exposed around the periphery of first article 100, as shown in FIG. 2. In other embodiments, midsole 151 may be completely covered by other elements, such as material layers from upper 102. For example, in some embodiments, midsole 151 and/or other portions of upper 102 may be disposed adjacent to a bootie.

Furthermore, as shown in FIG. 2, first article 100 may include a tongue 172, which may be provided near or along a throat opening 132. In some embodiments, tongue 172 may be provided in or near an instep region 110 of first article 100. However, in other embodiments, tongue 172 may be disposed along other portions of an article of footwear, or an article may not include a tongue.

In addition, as noted above, in different embodiments, first article 100 may include a tensioning system 150. Tensioning system 150 may comprise various components and systems for adjusting the size of opening 130 leading to an interior void and tightening (or loosening) upper 102 around a wearer's foot. Some examples of different tensioning systems that can be used are disclosed in Beers et al., U.S. Patent Publication Number 2014/0070042 published Mar. 13, 2014, (previously U.S. patent application Ser. No. 14/014,555, filed Aug. 30, 2013) and entitled "Motorized Tensioning System with Sensors" and Beers et al., U.S. Pat. No. 8,056,269, issued Nov. 15, 2011 (previously U.S. Patent Publication Number 2009/0272013, published Nov. 5, 2009) and entitled "Article of Footwear with Lighting System" the entire disclosures of which are incorporated herein by reference.

In some embodiments, tensioning system 150 may comprise one or more laces, as well as a motorized tensioning device. A lace may be configured to pass through various lacing guides 154, which may be further associated with the edges of a throat opening 132. In some cases, lacing guides 154 may provide a similar function to traditional eyelets on uppers. In particular, as a lace is pulled or tensioned, throat opening 132 may generally constrict so that upper 102 is tightened around a foot.

The arrangement of lacing guides 154 in FIG. 1 is only intended to be exemplary and it will be understood that other embodiments are not limited to a particular configuration for lacing guides 154. Furthermore, the particular types of lacing guides 154 illustrated in the embodiments are also exemplary and other embodiments may incorporate any other kinds of lacing guides or similar lacing provisions. In some other embodiments, for example, laces could be inserted through traditional eyelets. Some examples of lace guiding provisions that may be incorporated into the embodiments are disclosed in Cotterman et al., U.S. Patent Application Publication Number 2012/0000091, published Jan. 5, 2012 and entitled "Lace Guide," the disclosure of which is incorporated herein by reference in its entirety. Additional examples are disclosed in Goodman et al., U.S. Patent Application Publication Number 2011/0266384, published Nov. 3, 2011 and entitled "Reel Based Lacing System", the disclosure of which is incorporated herein by reference in its entirety. Still additional examples of lace guides are disclosed in Kerns et al., U.S. Patent Application Publication Number 2011/0225843, published Sep. 22, 2011 and entitled "Guides For Lacing Systems," the disclosure of which is incorporated herein by reference in its entirety.

A lace as used with first article 100 may comprise any type of type of lacing material known in the art. Examples of laces that may be used include cables or fibers having a low modulus of elasticity as well as a high tensile strength. A lace may comprise a single strand of material, or can comprise multiple strands of material. An exemplary material for the lace is SPECTRA™, manufactured by Honeywell of Morris Township N.J., although other kinds of extended chain, high modulus polyethylene fiber materials can also be used as a lace. Still further exemplary properties of a lace can be found in the Reel Based Lacing Application mentioned above.

Thus, in some embodiments, a lace may be passed through lacing guides 154. In other embodiments, a lace may pass through internal channels within upper 102 after entering channel openings that are near lacing guides 154. In some embodiments, internal channels extend around the sides of upper 102 and guide the lace towards a motorized tensioning device disposed in sole structure 104. In some cases, the motorized tensioning device may include provisions for receiving portions of a lace. In some cases, end portions of the lace can exit internal channels of upper 102 and can pass through apertures in a housing unit that contains a motorized tensioning device.

In some embodiments, a motorized tensioning device may generally be configured to automatically apply tension to a lace for purposes of tightening and loosening upper 102. A motorized tensioning device may thus include provisions for winding a lace onto, and unwinding a lace from, a spool internal to the motorized tensioning device. Moreover, the provisions may include an electric motor that automatically winds and unwinds the spool in response to various inputs or controls.

Figure 3:
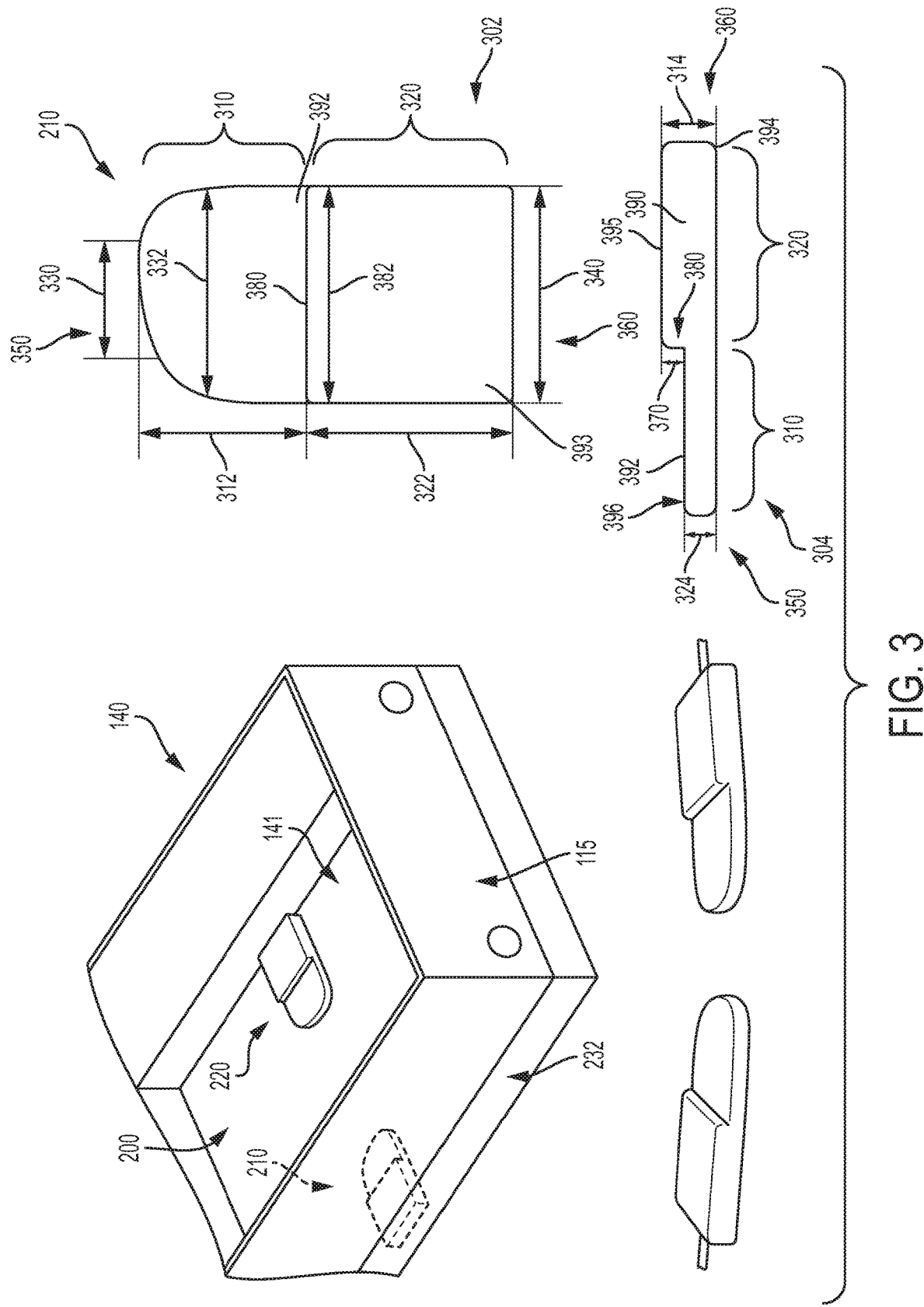
FIG. 3 is a series of schematic views of an embodiment of charging device.

As noted above, in different embodiments, charging system 140 may include charging unit 200 comprising first device 210 and second device 220. In some cases, charging unit 200 may facilitate the transfer of power to one or more articles of footwear. In other words, charging unit 200 may substantially comprise the charging station and/or the functions of a charging system as described above with respect to FIG. 2. Referring now to FIG. 3, an isometric view of a portion of container 115 is depicted, including a view of interior portion 141 containing first device 210 and second device 220. In some embodiments, first device 210 and/or second device 220 may be joined to the surface of or a portion of container 115. Thus, in some embodiments, as noted above, base portion 232 or other portions of container 115 can include or be adjacent to one or more components of charging system 140.

In one embodiment, charging unit 200 may be connected with, integral with, or fixedly attached to base portion 232 or a portion of container 115. For example, in one embodiment, base portion 232 can contact, link, join, or be otherwise attached to a portion of first device 210 and/or second device 220. In some cases, first device 210 and/or second device 220 can include a port that connects charging unit 200 with charging system 140. In some embodiments, first device 210 and/or second device 220 may each include an external inductive loop disposed within the device. As will be discussed further below, in some embodiments, each external inductive loop may be associated with an internal inductive loop of a corresponding article of footwear.

Furthermore, in some cases, base portion 232 can include one or more locating features to facilitate alignment of charging unit 200 within interior portion 141. As noted previously, in embodiments using an inductive charging system, it may be necessary to ensure proper alignment of internal inductive loops within the system with respect to other regions. Thus, in different embodiments, base portion 232 can include various recessed portions (not shown here) that correspond with first device 210 and/or second device 220, respectively. In some cases, recessed portions may be shaped to accommodate the insertion or installation of bottom surfaces of first device 210 and/or second device 220, respectively. This arrangement can help ensure proper alignment between base portion 232 and charging unit 200, which can facilitate efficient charging.

It should be understood that in other embodiments, other types of locating features may be used. For example, in some cases, base portion 232 can be configured with recesses that engage protrusions located on bottom surfaces of first device 210 and/or second device 220. In other cases, base portion 232 can be configured with protrusions that engage recesses located on bottom surfaces of first device 210 and/or second device 220. In still other embodiments, other types of locating features that are known in the art can be used. With these arrangements, each charging device can be maintained in a predetermined location with respect to base portion 232. In particular, first article 100 and second article 101 may be subsequently positioned in a manner that orients any internal inductive loops with the external inductive loops associated with first device 210 and/or second device 220 and allow inductive coupling to occur.

To better illustrate an embodiment of charging unit 200 for the reader, a top-down view 302 and a side view 304 of first device 210 are included in FIG. 3. Although second device 220 is not similarly depicted, it should be understood that features and descriptions provided regarding first device 210 may be generally applicable to second device 220 in different embodiments.

As shown in top-down view 302, in some embodiments, first device 210 may include two portions. A first portion 310 may be disposed adjacent to a second portion 320. First portion 310 and second portion 320 may be joined along a central region 380. In some embodiments, first portion 310 and second portion 320 may be fixedly joined or integrally joined. In one embodiment, first portion 310 and second portion 320 comprise substantially similar materials along their outer surfaces.

First device 210 may have different shapes in different embodiments. In some embodiments, first portion 310 may comprise a generally rectangular base associated with second portion 320. Furthermore, second portion 320 may comprise a square-like portion with a rounded or curved edge on one side. However, in other embodiments, the dimensions and/or shape of first portion 310 and/or second portion 320 may differ, including but not limited to oblong, triangular, square, rectangular, oval, elliptical, or other regular or irregular shapes. In some embodiments, the shape of first device 210, and in particular second portion 320, may be configured to correspond or match with a portion of first article 100, as will be discussed further below.

In addition, different portions of first device 210 may comprise varying dimensions. In some cases, the dimensions of first device 210 may be configured to accommodate a corresponding portion in an article of footwear, as noted above. In the embodiment of FIG. 3, it can be seen that first portion 310 has a first length 312 and second portion 320 has a second length 322, together comprising the full length of first device 210. In some embodiments, first length 312 and second length 322 may be substantially similar, as shown in FIG. 3. However, in other embodiments, first length 312 may be greater than or smaller than second length 322.

First device 210 extends from a first end 350 to a second end 360. In some embodiments, first end 350 is associated with the curved region of first portion 310, while second end 360 is associated with a substantially straight or linear end of second portion 320. In addition, first portion 310 has a first width 330 associated with the rounded first end 350, and second portion 320 has a second width 340 associated with second end 360. Central region 380 may also include a third width 382. In some embodiments, third width 382 may be substantially similar to second width 340, as shown in FIG. 3. Furthermore, in some embodiments, first width 330 may be smaller than second width 340. However, in other embodiments, first width 330 may be substantially similar to or greater than second width 340.

Referring now to side view 304, first portion 310 also includes a first thickness 324, and second portion 320 includes a second thickness 314. In one embodiment, first thickness 324 may be generally consistent throughout first portion 310, and second thickness 314 may be generally consistent throughout second portion 320. However, in other embodiments, there may be irregularities throughout first device, such that the thicknesses of the two portions are not consistent. In addition, as shown in FIG. 3, in one embodiment, first thickness 324 may be less than second thickness 314. However, in other embodiments, first thickness 324 may be substantially similar to or greater than second thickness 314.

In some embodiments, due to the difference in thickness between first portion 310 and second portion 320, there may be a portion of first device 210 that is raised with respect to another portion. Referring to side view 302, it can be seen that second portion 320 is raised with respect to first portion 310 along central region 380, such that there is a third thickness 370 representing the difference in thickness between the two portions. In other words, a first top surface 392 of first portion 310 may be recessed with respect to a second top surface 393 of second portion 320. Thus, in one embodiment, there may be a recessed step 396 that is formed, associated with the difference in thickness of first top surface 392 and second top surface 393. This difference in thickness can facilitate the link or association between first device 210 and an article of footwear in some embodiments, as will be discussed below.

In some embodiments, while first top surface 392 and second top surface 393 together may be uneven or discontinuous, a bottom surface 394 of first device 210 may be substantially continuous. In one embodiment, bottom surface 394 may be generally smooth and/or flat. However, in other embodiments, bottom surface 394 may comprise undulations or bumps, or other types of texturing. In some cases there may be traction elements disposed along bottom surface 394 to help anchor or secure first device 210, for example.

Furthermore, extending between bottom surface 394 and the top surface (comprising both first top surface 392 and second top surface 393), first device 210 can include sidewalls 390. In different embodiments, sidewalls 390 can represent or be associated with the varying thicknesses of first device 210. In some embodiments, sidewalls 390 may be substantially continuous, and extend in a smooth manner around the perimeter of first device 210. However, in other embodiments, sidewalls 390 may include protrusions or other irregularities that can help secure or anchor first device 210, and/or help connect first device 210 to other components.

Furthermore, in some embodiments, the housing associated with charging devices and other components of charging system can be formed of various materials. In some embodiments, first device 210 can comprise different plastics, polymers, thermoplastic polyurethane (TPU), nylon, glass, carbon fiber, carbon composites, or other types of materials. In some embodiments, portions of a charging device may comprise a light-diffusive material.

Figure 4:
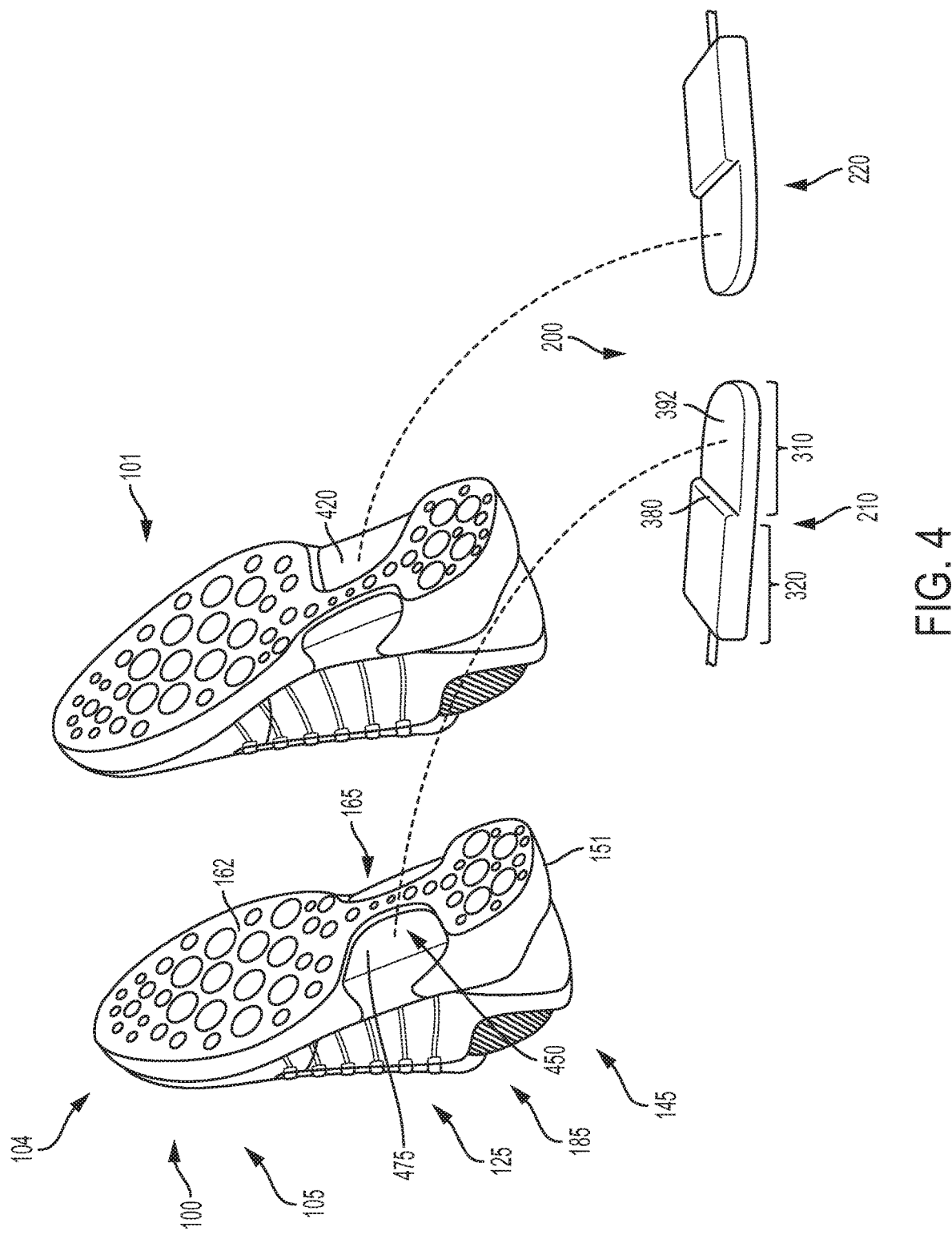
FIG. 4 is a schematic bottom-side view of an embodiment of a pair of footwear with a pair of charging devices.
Figure 5:
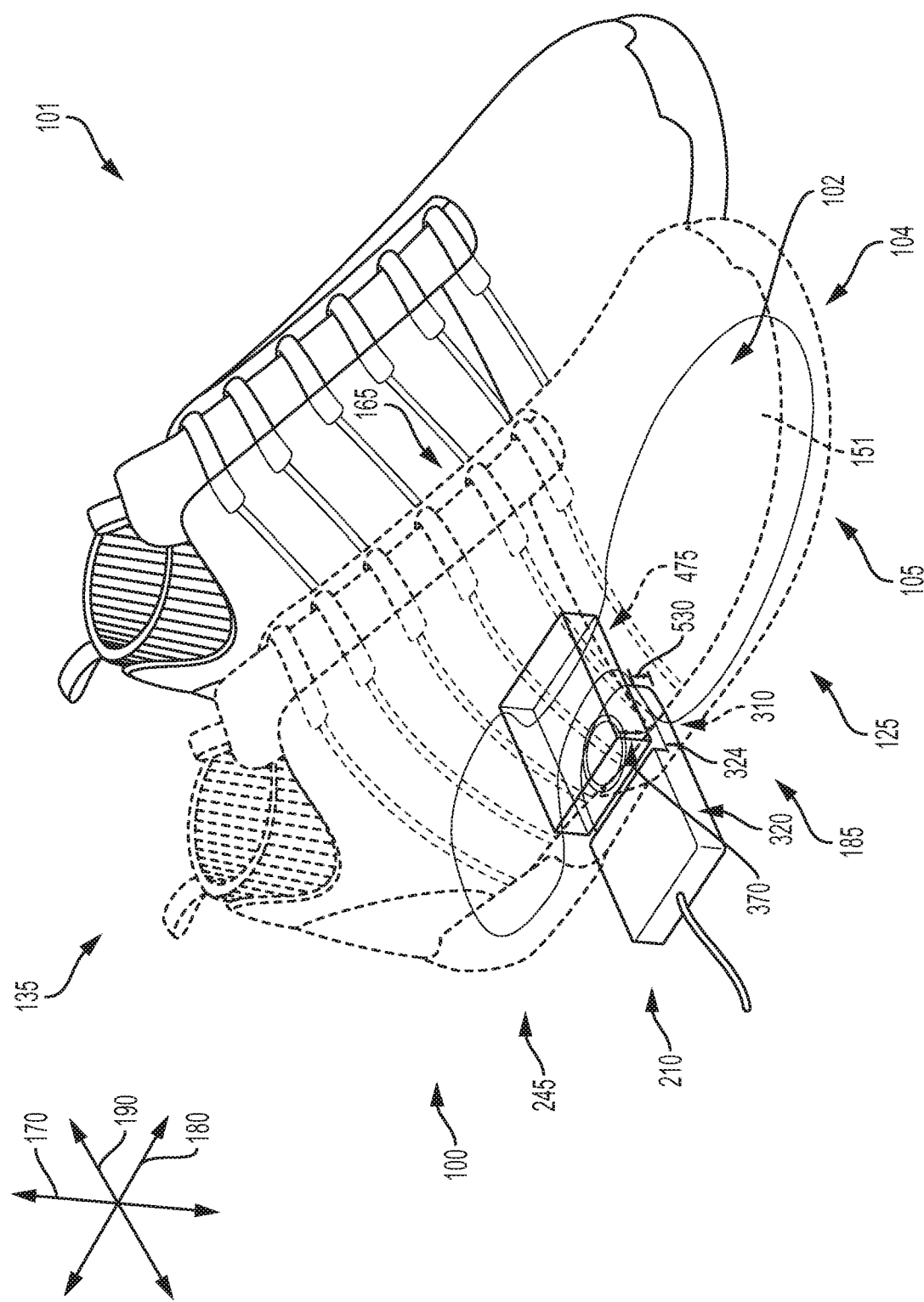
FIG. 5 is a schematic isometric view of an embodiment of a pair of footwear with a pair of charging devices.
Figure 6:
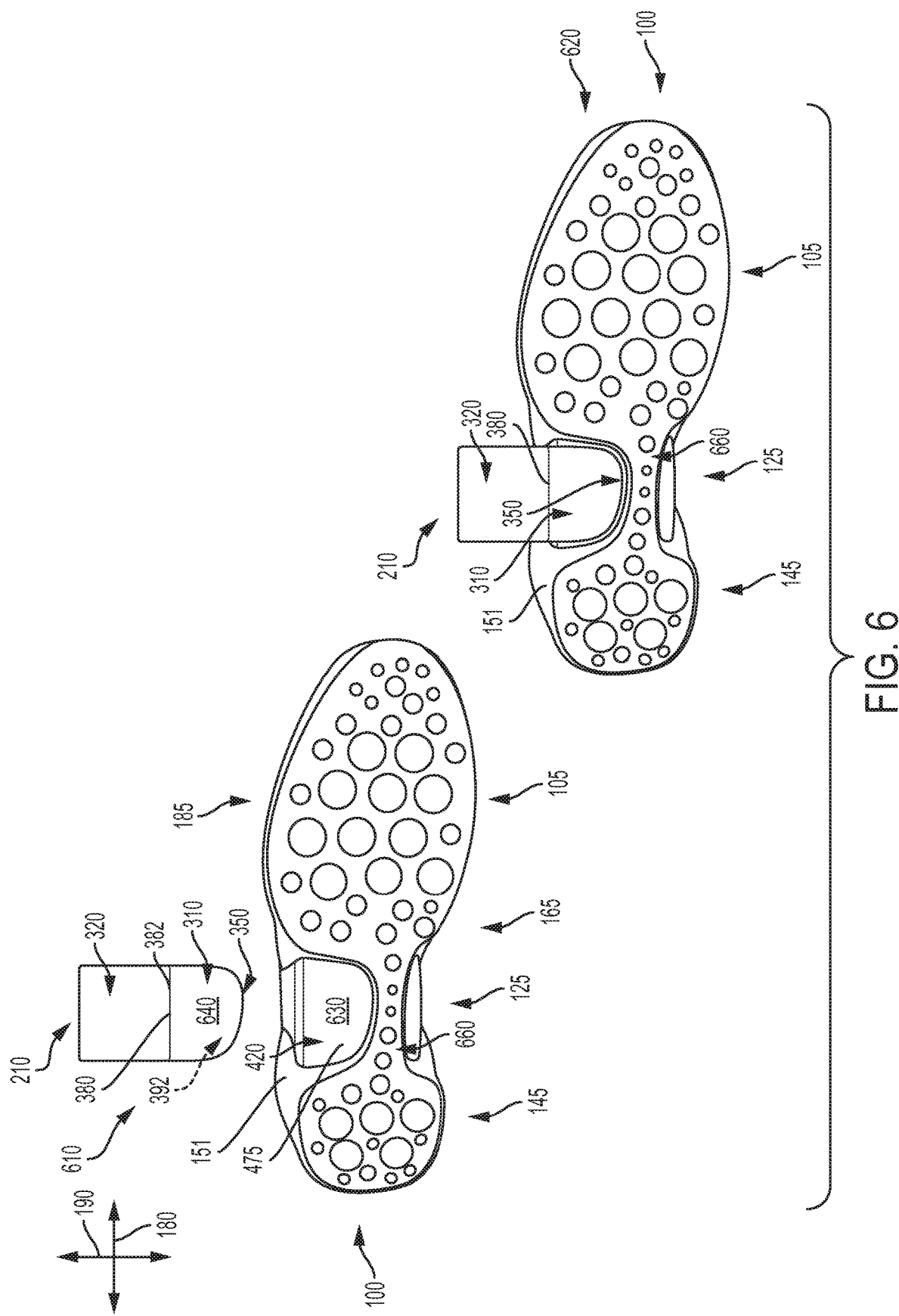
FIG. 6 is a schematic bottom-side view of an embodiment of an article of footwear with a charging device.

Referring now to FIGS. 4-6, in different embodiments, charging unit 200 may be configured for use with pair 135. For purposes of illustration the discussion herein will focus on first device 210 and first article 100. However, it should be understood that features and descriptions provided regarding first device 210 and first article 100 (as well as components associated with first article 100) may be generally applicable to second device 220 and second article 101 in some embodiments.

In FIG. 4, a bottom isometric view of pair 135 including first article 100 and second article 101 is illustrated adjacent to charging unit 200 comprising first device 210 and second device 220. Dotted lines are included to represent an embodiment of a manner in which pair 135 may be subsequently aligned and positioned with respect to charging unit 200. As noted previously in FIG. 2, first article 100 can include midsole 151 and outsole 162. Furthermore, midsole 151 can be disposed adjacent to a sole plate 450. Sole plate 450 includes a portion along midfoot region 125 that is an exposed outer surface, which comprises a compartment with a cavity 475. As will be discussed with respect to FIGS. 5 and 6, a portion of a bottom surface 420 of cavity 475 may be substantially similar in general shape and dimensions to first top surface 392 of first portion 310 of first device 210. This correspondence between two components may allow the two surfaces to readily contact or adjoin one another in some embodiments.

In FIG. 5, pair 135 is shown as mounted or installed on charging unit 200. Upper 102 and portions of sole structure 104 are shown in dotted line to reveal the accommodation and alignment of the two charging devices with each article. Thus, as noted with respect to FIG. 4, a portion of the exposed bottom surface 420 of cavity 475 of sole plate 450 of first article 100 can be positioned such that it is disposed adjacent to first top surface 392 of first portion 310 of first device 210. Furthermore, cavity 475 may be disposed in a manner that is recessed with respect to midsole 151. In some embodiments, a recess 530 associated with the recess formed along article 100 associated with cavity 475 may be substantially similar to first thickness 324 of first portion 310 of first device 210 (described in detail with respect to FIG. 3). In addition, third thickness 370 associated with the difference between first thickness 324 and second thickness 314 (see FIG. 3) can allow the surface associated with central region 380 to press or contact a side surface of first article 100 along midsole 151. These correlations may permit cavity 475 to more snugly join and/or be lodged against the recessed step 396 (see FIG. 3) formed along central region 380 of first device 210. However, in other embodiments, first thickness 324 and depth 430 may differ, and the two elements may be joined together in a different way.

Referring now to FIG. 6, the dimensions of first device 210 relative to regions of sole structure 104 are illustrated in a bottom view to provide the reader with a better understanding of the secure fit that can occur between the charging device and the article during use of the charging system described herein. In a first view 610, first device 210 is shown above and adjacent to lateral side 185 of first article 100. First portion 310 has a first area 640 associated with first top surface 392, and cavity 475 has a second area 630 associated with bottom surface 420 that is disposed on lateral side 185 of a midsole bridge 660. As first article 100 and first device 210 are brought toward one another, as represented by second view 620, the dimensions of first device 210 and particularly of first portion 310 (described in detail with respect to FIG. 3) are "slid" into or snugly received by recess 530 that is present between cavity 475 and midsole 151. In one embodiment, a lateral edge of cavity 475 has an edge length 650 that is substantially similar to third width 382 of central region 380. Furthermore, the curvature of lateral side 185 of midsole bridge 660 may be substantially similar to the curvature of first end 350.

In some embodiments, the shape and dimensions of first device 210 and first article 100 may be formed to provide substantially matching portions, and allow a complementary mounting of sole structure 104 with first device 210. The additional stability and weight provided by second portion 320 as it is pressed against lateral side 185 of first article 100 can increase the snug fit between the charging device and the article. As noted previously, with these arrangements, each article can be maintained in a predetermined location with respect to their charging units during charging, which is especially beneficial in embodiments that incorporate an inductive charging system. In particular, first article 100 may be positioned in a manner that orients any internal inductive loops with any external inductive loops disposed within first portion 310.

In different embodiments, sole plate 450 as described herein may be assembled, mounted, installed with, incorporated, joined to, or otherwise disposed adjacent to an additional component of first article 100. FIGS. 7-10 provide various examples of the joining of sole plate 450 with different components associated with the sole structure of an article of footwear. As will be described below, in different embodiments, sole plate 450 with specially dimensioned cavity 475 (better illustrated in FIGS. 4-6) can be utilized with different sized footwear components. In other words, sole plate 450 may remain consistently shaped and dimensioned, yet be installed with different sole components that include different sizes and shapes. In one embodiment, sole plate 450 can thus be colloquially referred to as a "one size fits all" sole plate. Furthermore, in other embodiments, though sole plate 450 may be dimensioned differently than described here, sole cavity 475 may remain consistent in shape and dimension, continuing to permit different sized articles to be charged by a single "universal" charging system.

Figure 7:
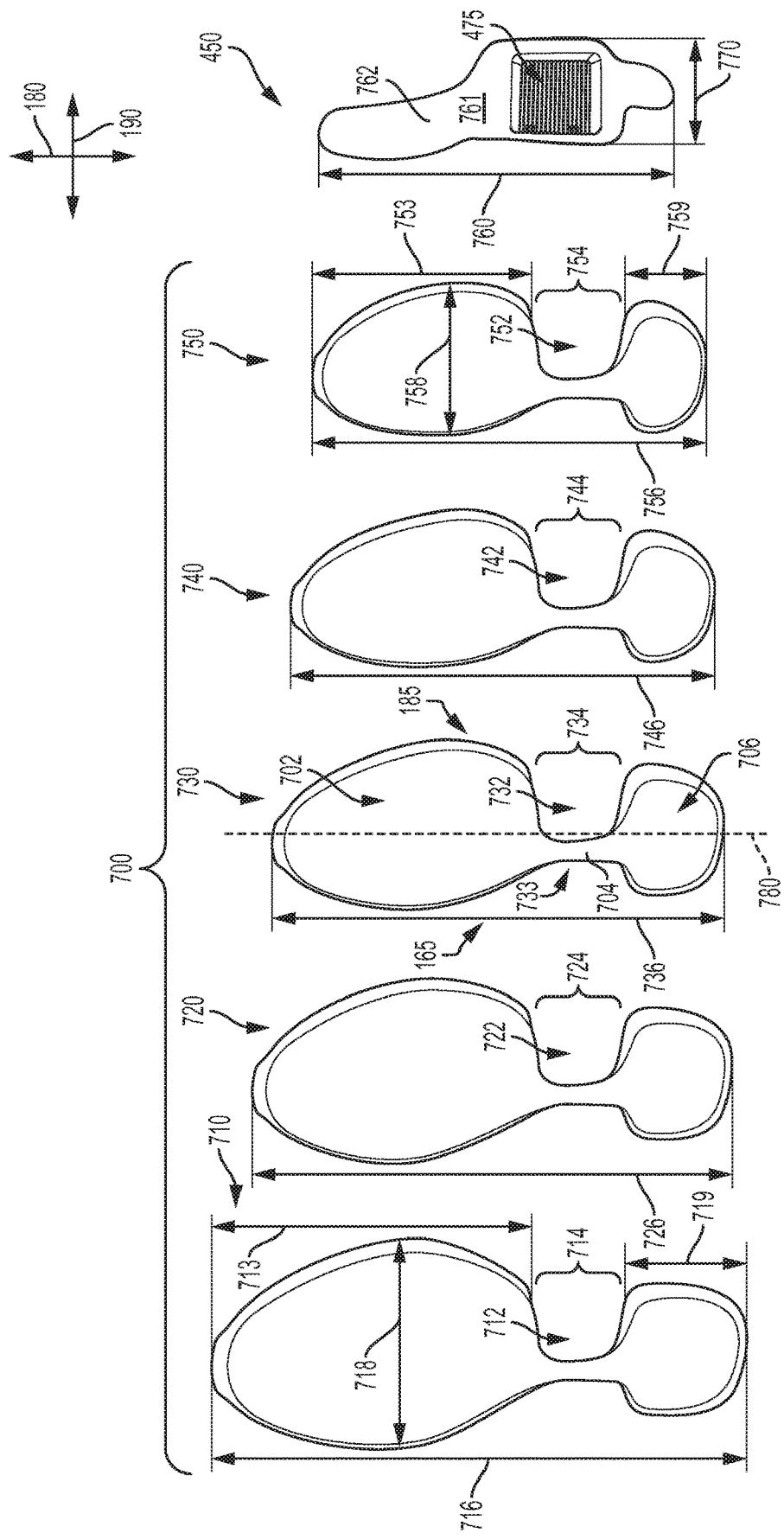
FIG. 7 is a schematic bottom-side view of different embodiments of a sole component for an article of footwear.

In FIG. 7, sole plate 450 is shown with a midsole set 700. Midsole set 700 can include several differently sized and/or shaped midsoles that can each be used with sole plate 450 in different embodiments. In FIG. 7, for purposes of illustration, midsole set 700 comprises a first midsole 710, a second midsole 720, a third midsole 730, a fourth midsole 740, and a fifth midsole 750. For purposes of reference, each midsole may be divided into a forefoot portion 702, a bridge portion 704, and a heel portion 706, as identified for the reader specifically with reference to third midsole 730. In different embodiments, the shape of each midsole can vary. In one embodiment, the shape of a midsole may resemble a generally elliptical or oval shape along forefoot portion 702, and a generally oblong rectangular shape comprising heel portion 706. Furthermore, in one embodiment, forefoot portion 702 and heel portion 706 can be joined along a substantially rectangular shaped bridge portion 704. Bridge portion 704 may be narrow relative to either forefoot portion 702 or heel portion 706. In other embodiments, the perimeter and shape of different portions of a midsole may vary from what is depicted here, and include any regular or irregular shape.

Each midsole of midsole set 700 can include varying dimensions in some embodiments. Thus, first midsole 710 includes a first length 716, second midsole 720 includes a second length 726, third midsole 730 includes a third length 736, fourth midsole 740 includes a fourth length 746, and fifth midsole 750 includes a fifth length 756. In some embodiments, two or more lengths may differ. As shown in FIG. 7, first length 716 is greater than second length 726, second length 726 is greater than third length 736, third length 736 is greater than fourth length 746, and fourth length 746 is greater than fifth length 756. In other embodiments, other midsoles may include varying sized lengths. In addition, the length of a single midsole may be irregular or non-uniform across the width of the midsole (i.e., along lateral axis 190).

Furthermore, in some embodiments, two or more widths of the midsoles may differ. For exemplary purposes, first midsole 710 is labeled with a first maximum width 718, and fifth midsole 750 is labeled with a second maximum width 758. In FIG. 7, first maximum width 718 is larger than second maximum width 758. In other embodiments, other midsoles may include varying sized widths. In addition, the width of a single midsole may be irregular or non-uniform across the length of the midsole (i.e., along longitudinal axis 180). In addition, first midsole 710 has a forefoot portion that is associated with a first forefoot length 713 and a heel portion that is associated with a first heel length 719, and second midsole 720 has a forefoot portion that is associated with a second forefoot length 753 and a heel portion that is associated with a second heel length 759.

In FIG. 7, first forefoot length 713 is greater than second forefoot length 753, and first heel length 719 is greater than second heel length 759. In other embodiments, other midsole forefoot portions and/or heel portions may include varying sized lengths or sizes. Thus, with respect to FIG. 7, it is important to note that each midsole can vary widely with respect to each other. Specifically, in some embodiments, first midsole 710 can have a forefoot portion that is dimensioned differently than the forefoot portion of fifth midsole 750 (or another midsole). Similarly, in some embodiments, first midsole 710 can have a heel portion that is dimensioned differently than the heel portion of fifth midsole 750 (or another midsole). In some embodiments, each midsole can be framed or configured to correspond with an individual user's foot size or type, as well as a user's comfort or functional preferences.

It can further be seen that, in different embodiments, sole plate 450 may be generally smaller in size than the various midsoles of midsole set 700. For example, while sole plate 450 has a plate length 760, fifth midsole 750 (here representing the smallest midsole of midsole set 700) has fifth length 756 that is greater than plate length 760. In addition, plate width 770 is generally smaller than second maximum width 758 of fifth midsole 750. Furthermore, a plate area 761 associated with the area of an inner surface side 762 of sole plate 450 may be significantly less than midsole area 751 associated with the area of an inner surface side of fifth midsole 750, where the inner surface sides represent the side of each sole component that would face a foot when an article including the various sole components is worn.

Thus, in some embodiments, various midsoles may be large enough to receive or accommodate at least a portion of sole plate 450. In some cases, a midsole may form or include a recessed portion that can be configured to receive or snugly accommodate sole plate 450 or another component.

In order for a single uniformly size sole plate 450 to be accommodated by or mounted within the various midsoles of midsole set 700, each midsole may comprise a portion that universally corresponds to a portion of sole plate 450 in some embodiments. Referring now specifically to bridge portion 704 labeled with third midsole 730 in FIG. 7, it may be noted that relative to a central longitudinal axis 780, bridge portion 704 can be disposed further toward one side versus another side. In other words, if it is understood that central longitudinal axis 780 represents a longitudinal midline of third midsole 730, bridge portion 704 can be disposed toward or along medial side 165. In other embodiments, bridge portion 704 may be disposed toward lateral side 185. In some cases, bridge portion 704 may be laterally offset with respect to central longitudinal axis 780. In another embodiment, bridge portion 704 may be disposed more centrally and/or encompass both medial side 165 and lateral side 185. Furthermore, the dimensions of bridge portion 704 may remain substantially similar along different midsoles in some embodiments.

As a result of the shape and size of bridge portion 704, there can be one or more open regions disposed or formed adjacent to bridge portion 704 in different embodiments. In FIG. 7, a first region 712 is shown associated with first midsole 710, a second region 722 is shown associated with second midsole 720, a third region 732 is shown associated with third midsole 730, a fourth region 742 is shown associated with fourth midsole 740, and a fifth region 752 is shown associated with fifth midsole 750. In some embodiments, each open region may generally correspond or align with a portion of sole plate 450 when sole plate 450 is installed in the midsole.

As noted above, each midsole of midsole set 700 can include varying dimensions in some embodiments. However, in other embodiments, portions of each individual midsole may be generally consistent with respect to another midsole. In FIG. 7, first region 712 has a first size 714, second region 722 has a second size 724, third region 732 has a third size 734, fourth region 742 has a fourth size 744, and fifth region 752 has a fifth size 754. In some embodiments, as shown in FIG. 7, two or more region sizes may be substantially similar. Thus, for example, first size 714, second size 724, third size 734, fourth size 744, and fifth size 754 can be substantially similar in size in one embodiment. In some embodiments, first size 714, second size 724, third size 734, fourth size 744, and fifth size 754 may be substantially similar in shape. Thus, as shown in FIG. 7, first region 712, second region 722, third region 732, fourth region 742, and fifth region 752 are substantially similar across midsole set 700. In other embodiments, there may be some differences between the regions in shape and dimension.

Figure 8:
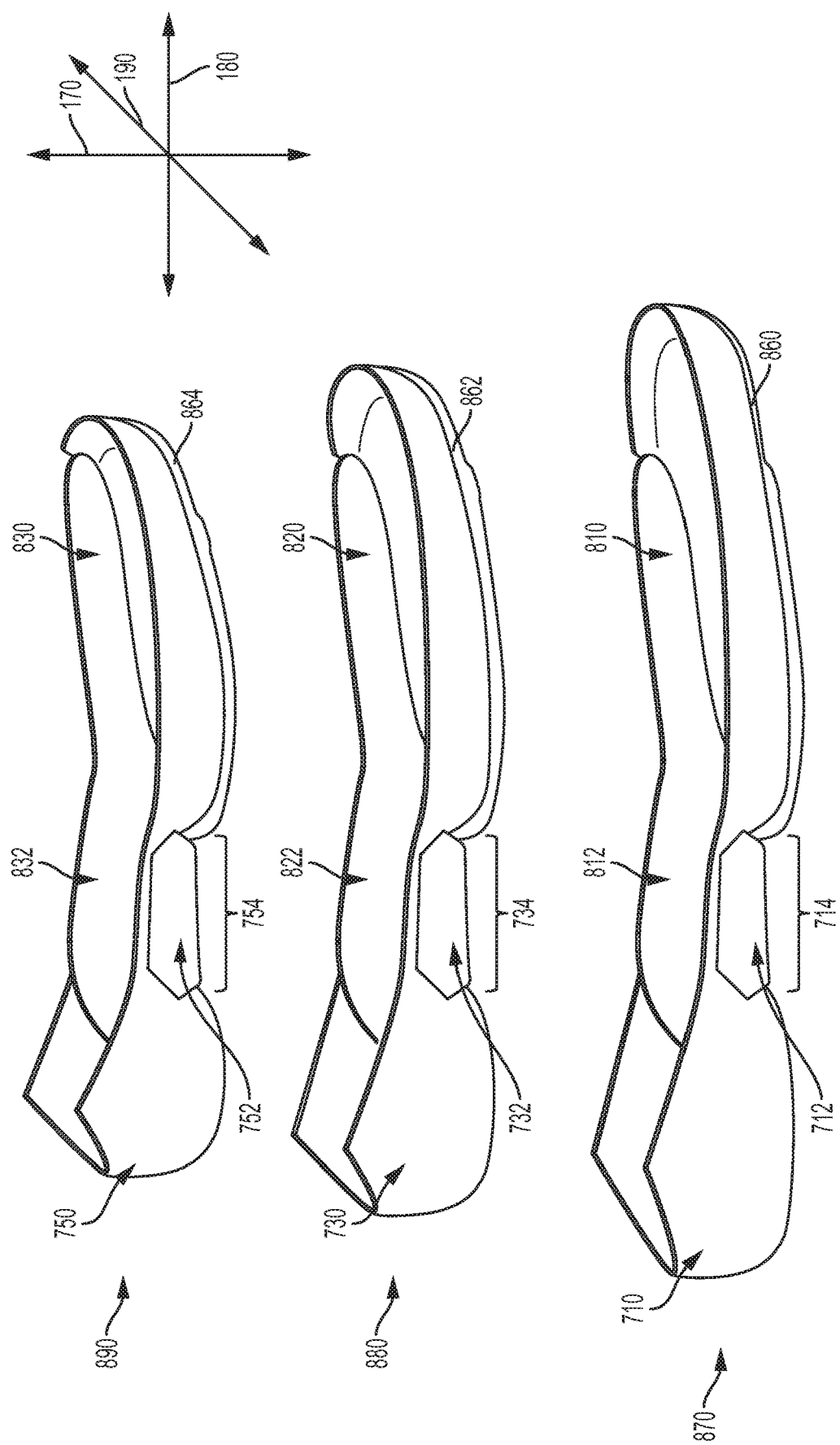
FIG. 8 is a schematic isometric side view of different embodiments of a sole component for an article of footwear.

Referring now to FIG. 8, sole plate 450 can be disposed or deposited within a recess associated with a midsole. In some embodiments, the arrangement of sole plate 450 with respect to the bridge portion of various midsoles (as discussed in FIG. 7) can allow the ready accommodation of sole plate 450 in a variety of midsole sizes. In FIG. 8, an isometric side view of an embodiment of three assembled sole structures is shown. Each assembled sole structure includes an outsole joined to a midsole. In addition, in some embodiments, as noted earlier, an assembled sole structure of the present embodiments can include a sole plate. Referring to FIG. 8, a first assembled sole structure 870, a second assembled sole structure 880, and a third assembled sole structure 890 are shown.

First assembled sole structure 870 includes a first outsole 860, first midsole 710, and a first sole plate 810. Second assembled sole structure 880 includes a second outsole 862, third midsole 730, and a second sole plate 820. Furthermore, third assembled sole structure 890 includes a third outsole 864, fifth midsole 750, and a third sole plate 830. As discussed with respect to FIG. 7, in some embodiments, midsoles may comprise various sizes or dimensions. It can be further seen in FIG. 8 that although each assembled sole structure generally varies in size and/or dimensions due to its differently sized midsoles, the sole plates associated with first assembled sole structure 870, second assembled sole structure 880, and third assembled sole structure 890 can be substantially similar. In other words, at least a portion of first sole plate 810, second sole plate 820, and third sole plate 830 may comprise a substantially similar shape and dimension in one embodiment. For example, the portion associated with the cavity of the sole plates may be configured to be substantially equivalent between individual sole plates. In one embodiment, a first cavity 812 associated with first sole plate 810, a second cavity 822 associated with second sole plate 820, and a third cavity 832 associated with third sole plate 830 may be substantially similar in shape, size, and/or dimensions. As an example, in one embodiment, first cavity 812 may be understood to include a first width, a first depth, and a first length, defining a first volume. In addition, second cavity 822 can comprise a second width, a second depth, and a second length, defining a second volume. Furthermore, third cavity 832 can comprise a third width, a third depth, and a third length, defining a third volume. In some embodiments, the first width, the second width, and the third width can be substantially similar. In addition, in some embodiments, the first depth, the second depth, and the third depth can be substantially similar. In a further embodiment, the first length, the second length, and the third length can be substantially similar. Thus, in some embodiments, the first volume, the second volume, and the third volume are substantially similar. Specifically, in some embodiments, the volume associated with first cavity 812 may be substantially similar to the volume associated with second cavity 822, and the volume associated with second cavity 822 may be substantially similar to the volume associated with third cavity 832.

In another embodiment, the substantial entirety of first sole plate 810 may be substantially similar to the substantial entirety of second sole plate 820. In another embodiment, the substantial entirety of second sole plate 820 may be substantially similar to third sole plate 830. Thus, in some embodiments, a single-sized ("universal") sole plate may be accommodated by, installed, or mounted within variously dimensioned and shaped midsoles.

In some embodiments, this universal pairing may be possible because each midsole includes a portion that consistently corresponds to a portion of the sole plate. As described previously with respect to FIG. 7, it can be noted again now with reference to FIG. 8 that first region 712 of first midsole 710 has first size 714, third region 732 of third midsole 730 has a third size 734, and fifth region 752 of fifth midsole 750 has a fifth size 754. In one embodiment, first size 714, third size 734, and fifth size 754 can be substantially similar. In other words, as each sole plate has a cavity that remains substantially similar in size, the portion of each midsole that aligns with the cavity of the sole plate when the sole plate and the midsole are joined can also be sized consistently. Thus, even in midsoles that are larger or smaller relative to one another, the region that aligns with the cavity of the sole plate can remain generally the same size in different embodiments. In some embodiments, this can allow a single size sole plate to be inserted into or used with multiple sized midsoles. In some cases, this can streamline the manufacturing process of the sole structure, as well as increase the production efficiency of the assembled articles. In addition, as will be described below with respect to FIG. 9, the universal sizing of the sole plate cavity can facilitate the assembly, installation, or insertion of other components in some embodiments.

Furthermore, in different embodiments, the outsoles of the present embodiments may include a shape and size substantially similar to that of at least a portion or bottom surface of the midsole. For example, in FIG. 8, it can be seen that first outsole 860 is adjacent to and covers a large portion of the bottom surface of first midsole 710, second outsole 862 is adjacent to and covers a large portion of the bottom surface of third midsole 730, and third outsole 864 is adjacent to and covers a large portion of the bottom surface of fifth midsole 750. In other embodiments, an outsole may comprise a different shape or size. In one embodiment, various outsoles may cover a smaller portion of the midsoles than depicted here. In other embodiments, the outsole may be substantially larger than its corresponding midsole. In one embodiment, there may be no outsole.

Figure 9:
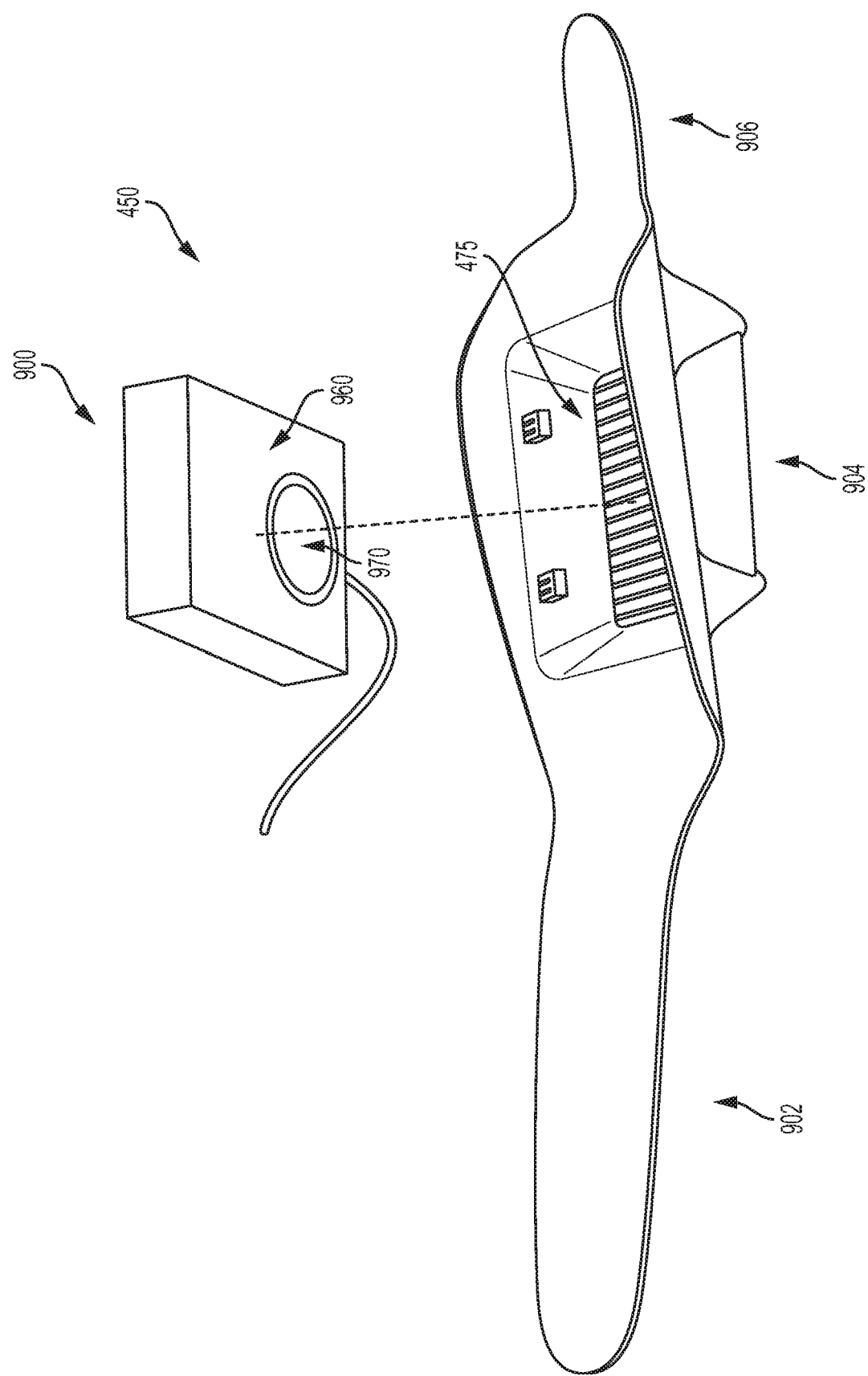
FIG. 9 is an isometric view of a sole plate and a component for an article of footwear.

In order to provide the reader with greater understanding of the proposed embodiments, an additional view of sole plate 450 is depicted in FIG. 9. Sole plate 450 can include different regions or sections in some embodiments. For purposes of reference, sole plate 450 may be divided into a forward portion 902, an intermediate portion 904, and a rear portion 906. In different embodiments, the shape of sole plate 450 can vary. In one embodiment, the shape of sole plate 450 may resemble a generally oblong shape comprising forward portion 902, joined to a substantially rectangular shape comprising intermediate portion 904. Intermediate portion 904 may be also joined to a substantially oblong shape comprising rear portion 906. In other embodiments, the perimeter and shape of different portions of sole plate 450 may vary from what is depicted here, and include any regular or irregular shape.

In some embodiments, portions of sole plate 450 may comprise a substantially flat or two-dimensional material or structure. The term "two-dimensional" as used throughout this detailed description and in the claims refers to any generally flat material exhibiting a length and width that are substantially greater than a thickness of the material. Although two-dimensional materials may have smooth or generally untextured surfaces, some two-dimensional materials will exhibit textures or other surface characteristics, such as dimpling, protrusions, ribs, or various patterns, for example. In other embodiments, the geometry of sole plate 450 could vary and could include various contours or features associated with parts of a foot, for example, the sole region of a foot.

Furthermore, in some embodiments, sole plate 450 and other components of a sole structure can be formed of various material compositions. In some embodiments, sole plate 450 can be associated with a higher stiffness or hardness than the upper. In one embodiment, sole plate 450 is at least partially formed of thermoplastic polyurethane (TPU). In other embodiments, sole plate 450 may comprise a glass-filled nylon material. In still other embodiments, sole plate 450 may comprise a glass-filled TPU. In some embodiments, sole plate 450 may comprise a light-diffusive material.

In one embodiment, one or more components may be configured to provide various functions or features to an article of footwear. For example, in FIG. 9, a component 900 comprises a housing unit. The housing unit can contain a motorized tensioning device 960 in one embodiment. In other embodiments, different mechanical or electrical components may be included, such as circuitry, textiles, or other materials. In the embodiment illustrated in FIG. 9, sole plate 450, and specifically cavity 475 formed in intermediate portion 904, may be manufactured such that sole plate 450 is configured to receive and snugly accommodate component 900. In some embodiments, the housing unit shown in FIG. 9 may include various mechanisms or components that can be utilized in tensioning system 150 (see FIG. 2). For example, within the interior of component 900 there may be a battery (or other power source), circuitry (or other control mechanism), spools, gears, a motor, light sources, and/or other mechanisms. In one embodiment, component 900 can include internal inductive loops 970 that can be charged by an inductive charging system. In some embodiments, component 900 may be easily deposited or inserted into cavity 475 of sole plate 450, as shown in FIG. 9.

Figure 10:
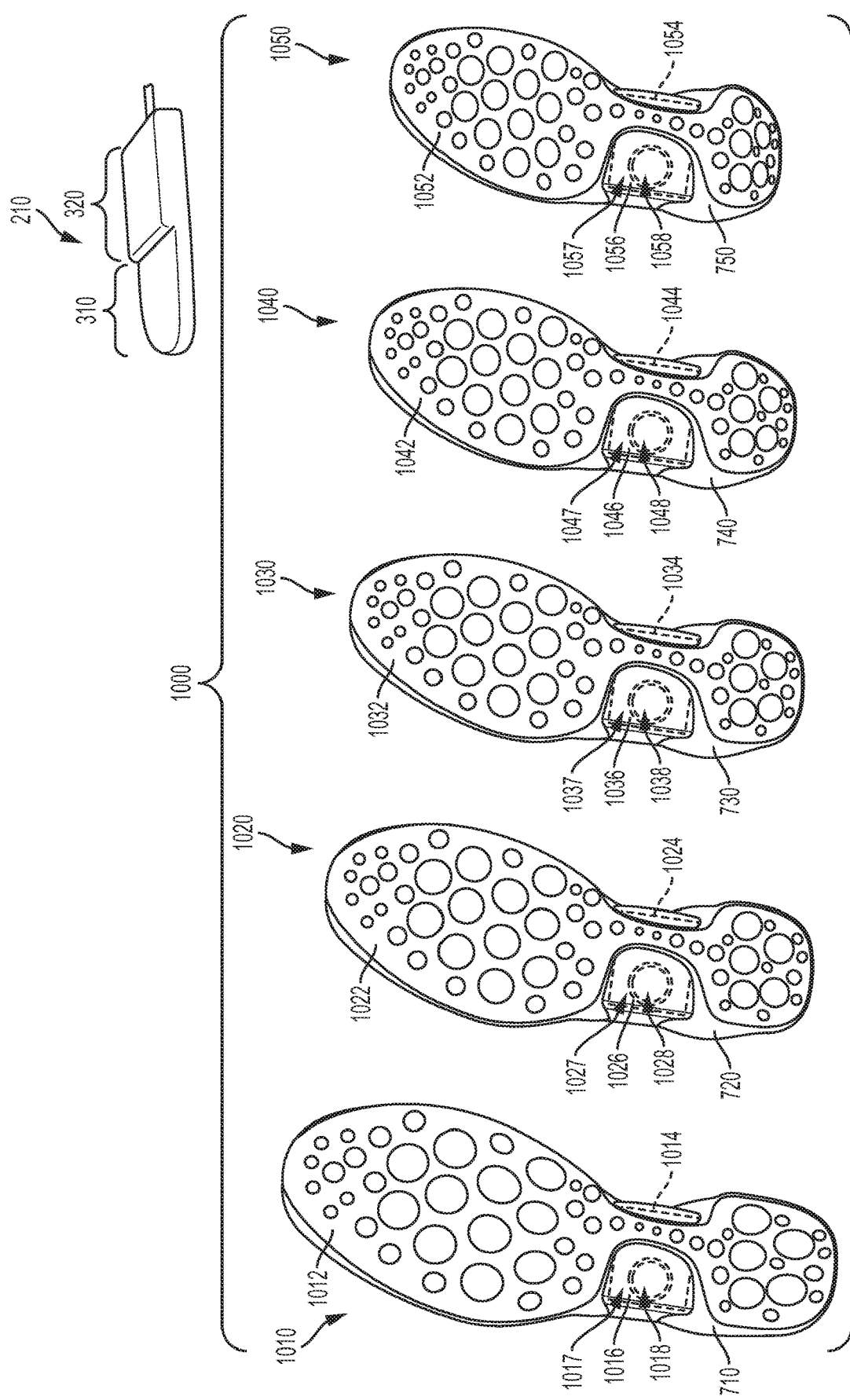
FIG. 10 is a schematic bottom-side view of different embodiments of a sole component for an article of footwear.

In different embodiments, after a sole plate is assembled within an article of footwear and a component is incorporated into the article, the article may be ready for use or mounting in a charging system. In some embodiments, articles of various sizes, shapes, dimensions, and/or configurations may be charged through charging system 140 (see FIGS. 1-3). Referring to FIG. 10, an article set 1000 is depicted, including a third article 1010, a fourth article 1020, a fifth article 1030, a sixth article 1040, and a seventh article 1050. Each article is depicted in a bottom isometric view.

For purposes of reference, it can be seen in FIG. 10 that third article 1010 includes a first outsole 1012, a first sole plate 1016, and first midsole 710, while fourth article 1020 includes a second outsole 1022, a second sole plate 1026, and second midsole 720. In addition, fifth article 1030 includes a third outsole 1032, a third sole plate 1036, and third midsole 730, sixth article 1040 includes a fourth outsole 1042, a fourth sole plate 1046, and fourth midsole 740, and seventh article 1050 includes a fifth outsole 1052, a fifth sole plate 1056, and fifth midsole 750. In different embodiments, while first midsole 710, second midsole 720, third midsole 730, fourth midsole 740 and/or fifth midsole 750 may be sized differently from one another (as described with respect to FIG. 7), each article may include sole plates that are substantially similar to one another. Similarly, first outsole 1012, second outsole 1022, third outsole 1032, fourth outsole 1042, and fifth outsole 1052 may differ in shape and/or dimensions. Nevertheless, in the embodiment of FIG. 10, first sole plate 1016, second sole plate 1026, third sole plate 1036, fourth sole plate 1046, and fifth sole plate 1056 disposed within the different articles comprising article set 1000 are substantially similar to one another. As an example, in some cases, first sole plate 1016 in third article 1010 and second sole plate 1026 in fourth article 1020 may be interchanged such that first sole plate 1016 is associated with fourth article 1020 and second sole plate 1026 is associated with third article 1010.

In some embodiments, the availability of a universally sized sole plate may provide benefits to a charging system. For example, again referring to FIG. 10, first sole plate 1016 has a first cavity 1017, second sole plate 1026 has a second cavity 1027, third sole plate 1036 has a third cavity 1037, fourth sole plate 1046 has a fourth cavity 1047, and fifth sole plate 1056 has a fifth cavity 1057. In one embodiment, first cavity 1017, second cavity 1027, third cavity 1037, fourth cavity 1047, and fifth cavity 1057 may be substantially similar in size, shape, and dimension. Furthermore, in some cases, first cavity 1017 may be approximately duplicated as second cavity 1027. In embodiments where each sole plate is substantially similar, the dimensions of each cavity may be likewise substantially similar. In other words, portions of sole plates may be manufactured to be substantial reproductions of one another, yet be installed in articles with differently sized footwear components. In addition, in some embodiments, first cavity 1017, second cavity 1027, third cavity 1037, fourth cavity 1047, and fifth cavity 1057 may be substantially similar in size, shape, and dimension while at least some of the remaining portions of first sole plate 1016, second sole plate 1026, third sole plate 1036, fourth sole plate 1046, and fifth sole plate 1056 differ from one another. In other words, sole plates may be sized or shaped differently for use in different size or type of footwear, yet nevertheless be compatible with the same charging system due to the universal size and dimension of each cavity included or formed in the individual sole plates.

As noted above with respect to FIG. 9, in some embodiments, each cavity disposed within a sole plate can include a component. In FIG. 10, the different components disposed within the various articles are illustrated with a dotted line. In the embodiment of FIG. 10, first cavity 1017 includes a first component 1014, second cavity 1027 includes a second component 1024, third cavity 1037 includes a third component 1034, fourth cavity 1047 includes a fourth component 1044, and fifth cavity 1057 includes a fifth component 1054. Furthermore, each component can be associated with a housing that comprises a device, as noted with respect to FIG. 9. In some embodiments, the device disposed within the component can include an inductive loop. Referring to FIG. 10, first component 1014 includes a first loop 1018, second component 1024 includes a second loop 1028, third component 1034 includes a third loop 1038, fourth component 1044 includes a fourth loop 1048, and fifth component 1054 includes a fifth loop 1058. In some embodiments, each loop can be charged by an inductive charging system. In some cases, each of the loops identified herein can be positioned in the housing to facilitate the charging of components. For example, as shown in FIG. 10, first loop 1018 is disposed toward or adjacent to the exposed portion of first cavity 1017. As described earlier with respect to FIGS. 4-6, the exposed portion of first cavity 1017 may be placed or disposed adjacent to first portion 310 of first device 210, which can permit alignment of the internal inductive loops (here first loop 1018) disposed within each article with any external inductive loops disposed in first device 210.

Figure 11:
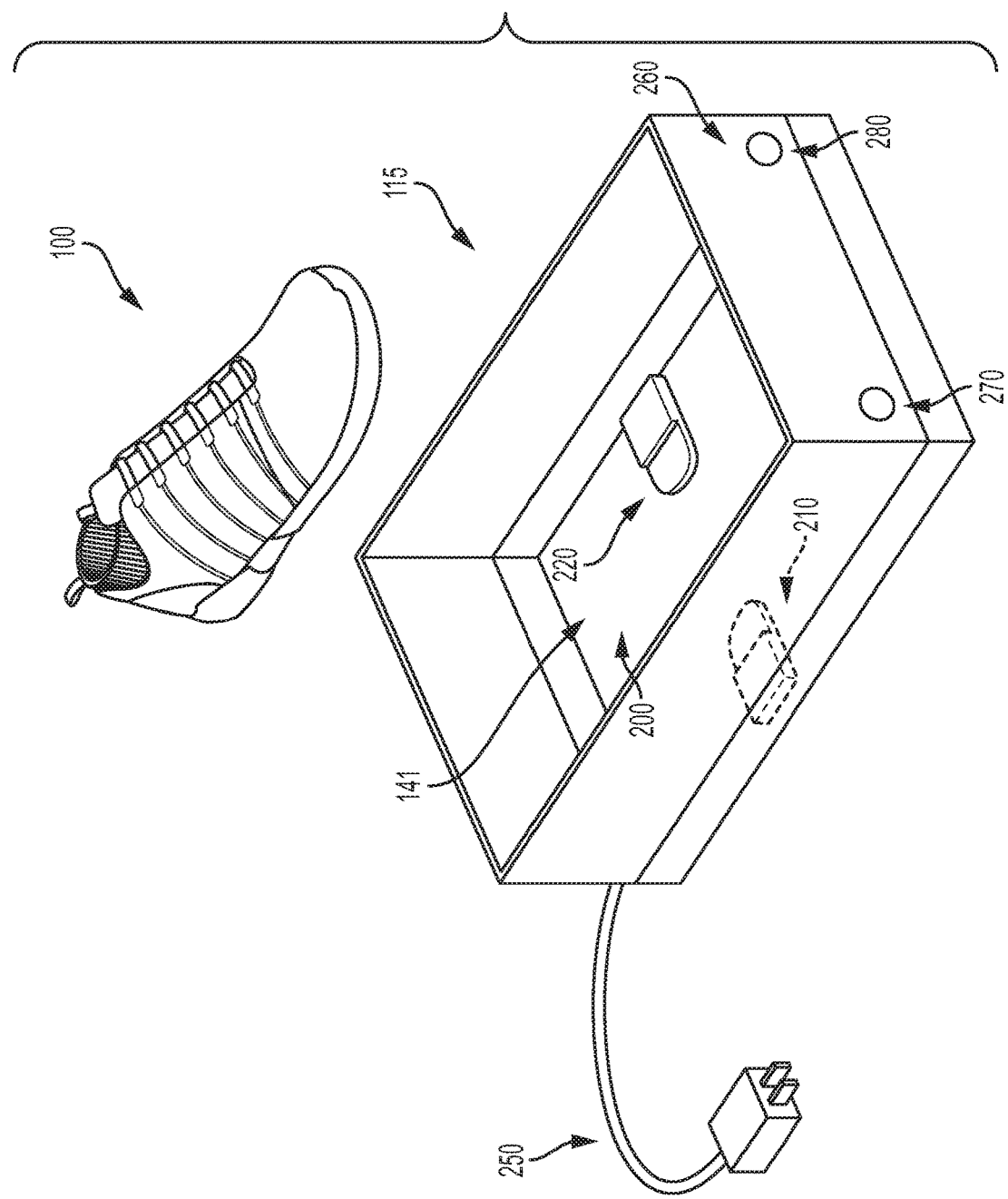
FIG. 11 is a schematic isometric view of an embodiment of an article of footwear with a charging system.
Figure 12:
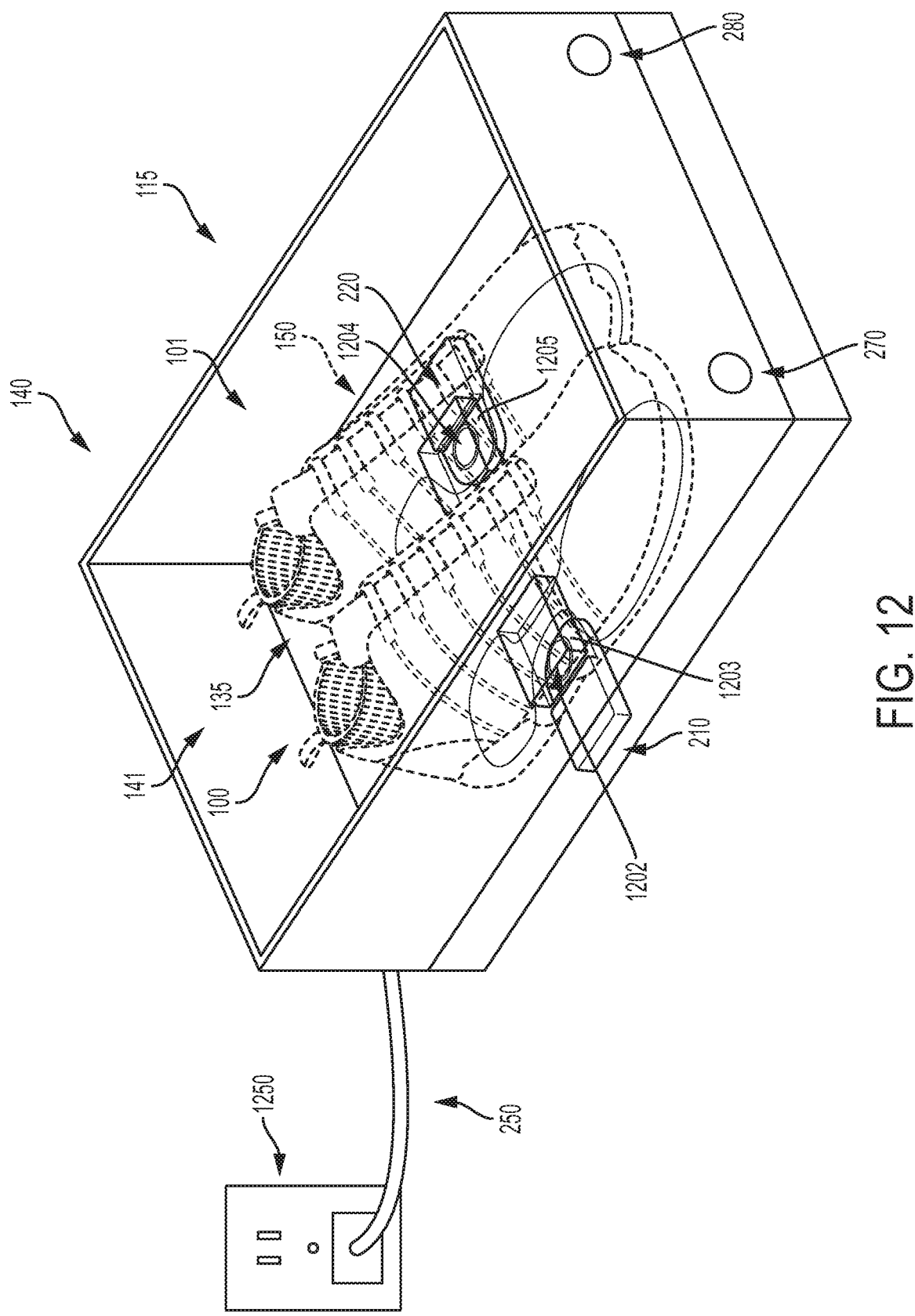
FIG. 12 is a schematic isometric view of an embodiment of a pair of footwear with a charging system.

FIGS. 11 and 12 illustrate an isometric view of container 115. In FIG. 11, container 115 is substantially empty, where charging unit 200 is disposed within interior portion 141, but neither first device 210 nor second device 220 have been linked with an article. Cord 250 remains unconnected to any additional power source. In some embodiments, indicators 260 comprising first indicator 270 and second indicator 280 are not lit. In other words, charging has not yet been initiated in the embodiment of FIG. 11.

In FIG. 12, charging system 140 has been activated and articles are being charged. Thus, container 115 now includes pair 135 comprising first article 100 and second article 101, inserted within interior portion 141. Referring to FIG. 12, a first internal inductive loop 1202 of first article 100 may be aligned with first external inductive loop 1203 in first device 210. Likewise, a second internal inductive loop 1204 of second article 101 may be aligned with a second external inductive loop 1205 in second device 220. With this arrangement, power can be efficiently transferred from charging system 140 to pair 135. Furthermore, as described above, variously sized articles that include the universal sole plate may be inserted or used with charging system 140 without altering the dimensions of charging unit 200. This can facilitate the efficiency of manufacture of charging system 140 in some embodiments. In one embodiment, the universal charging system may permit a user to purchase additional articles and charge different pairs of footwear with a single charging system. In another embodiment, a group of individuals who have different shoe sizes (and different sized articles) may share a single charging system.

In some embodiments, electricity received at an external power source can be transferred to the charging unit via cord 250. The electricity can then be transferred to first external inductive loop 1203. By using an external power source with an alternating current, power can be inductively transferred between first external inductive loop 1203 and first internal inductive loop 1202. In particular, an alternating magnetic field can be created at first external inductive loop 1203, which induces a current in first internal inductive loop 1202. This arrangement allows power to be transferred to a rechargeable power source, such as a battery, disposed within first article 100, which can provide power for a lighting system and/or an automatic fastening system.

In a similar manner, electricity received at the charging unit can be transferred to second external inductive loop 1205. By using an external power source with an alternating current, power can be inductively transferred between second external inductive loop 1205 and second internal inductive loop 1204. In particular, an alternating magnetic field can be created at second external inductive loop 1205, which induces a current in second internal inductive loop 1204. This arrangement allows power to be transferred to a rechargeable power source, such as a battery, disposed within second article 101, which can provide power for a lighting system and/or an automatic fastening system.

Furthermore, it should be understood that the charging system described herein may differ in other ways. For example, the charging system of the present disclosure may include features of charging systems disclosed in Beers et al., U.S. Pat. No. 8,058,837, issued Nov. 15, 2011 (previously U.S. patent application Ser. No. 12/369,410, filed Feb. 11, 2009) and entitled "Charging System for an Article of Footwear" the entire disclosure of which is incorporated herein by reference.

Figure 13:
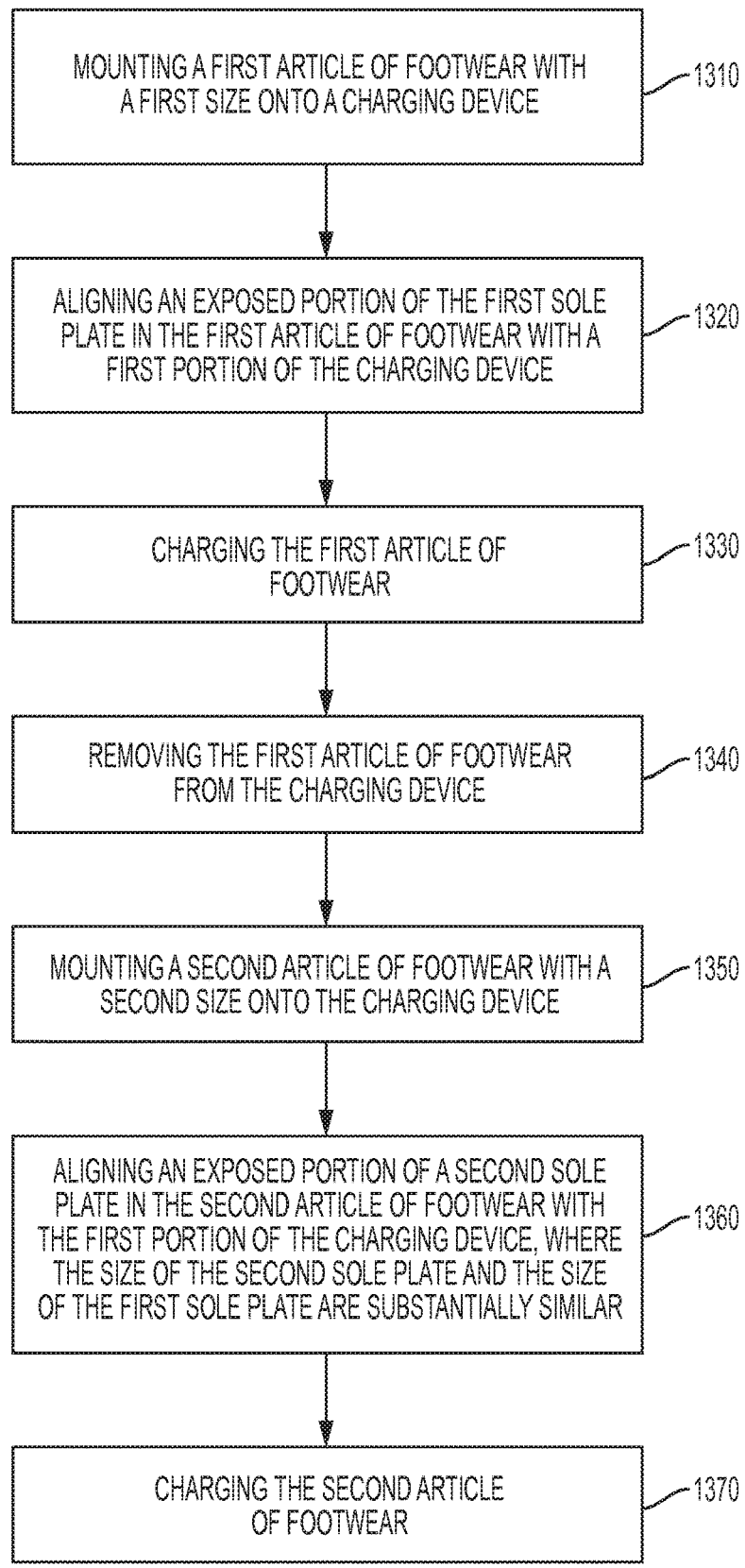
FIG. 13 is an embodiment of a flow chart for a method of charging articles of footwear.

It should be understood that the embodiments of the charging system depicted herein may be used in different ways. For purposes of illustration, FIG. 13 provides a flow chart depicting one method of charging articles of footwear. In one embodiment, the method of charging can include a first step 1310 of mounting a first article of footwear with a first size onto a charging device. In different cases, the article may include various sole structure components, as discussed above. In a second step 1320, an exposed portion of a first sole plate in the first article of footwear can be aligned with a first portion of the charging device. A third step 1330 can comprise charging the first article of footwear. In a fourth step 1340, the first article of footwear can be removed from the charging device. In some embodiments, the first article of footwear may be removed after first article of footwear is fully charged. A fifth step 1350 can involve mounting a second article of footwear with a second size onto the charging device. In a sixth step 1360, an exposed portion of a second sole plate in the second article of footwear can be aligned with the first portion of the charging device. In one embodiment, the size of the second sole plate and the size of the first sole plate are substantially similar. A seventh step 1370 can involve charging the second article of footwear.

In other embodiments, a pair of footwear can be charged simultaneously and removed to permit the charging of additional pairs of footwear. Furthermore, additional embodiment can further comprise the step of inserting the first article of footwear into an interior void of a container that contains the charging device. In another embodiment, second step 1320 of mounting the first article of footwear may include aligning the first sole plate with the charging device in a manner that inductively couples an internal inductive loop disposed within the first article of footwear with an external inductive loop disposed in the first portion of the charging device. In some embodiments, there can be a further step comprising removing the second article of footwear, and mounting a third article of footwear onto the charging device and charging the third article of footwear. In one embodiment, the third article of footwear has a third size different from the first size and the second size. Furthermore, in some embodiments, the step of mounting the third article of footwear includes aligning a portion of a cavity associated with a third sole plate disposed in the third article of footwear with the first portion of the charging device. In other embodiments, the method can include placing the first article of footwear along a base portion disposed along the bottom of the container. In addition, the step of removing the first article of footwear may also include waiting until the first article of footwear is fully charged in some embodiments.

It will be understood that the charging system discussed in this detailed description and in the claims can be used independently of a fastening system or a lighting system. In particular, since the charging system discussed in this detailed description is used to charge a battery of some kind, that battery can be further coupled to one or more different electrical systems. Generally, the charging system discussed in this detailed description and in the claims may be used to power any type of electrical system associated with an article of footwear. For example, in another embodiment, the charging system discussed in this embodiment could be used to charge a battery to power an accelerometer or a sensor for tracking distance and motion. In still another embodiment, the charging system discussed here could be used to power a heating and/or cooling system for an article. Furthermore, it will be understood that the charging system could be used to power two or more electrical systems simultaneously. In addition, the embodiments of the "universal" charging system as described herein may be utilized in any type or configuration of footwear or article of apparel with any type of system or mechanism.

Thus, in some embodiments, by providing a universally sized intermediate portion 904 (see FIG. 9) along a midsole and a single sized cavity in the corresponding sole plate, a single charging system and/or charging units can be used with different sized footwear. In other words, the charging system need not be adjusted to accommodate different sizes of footwear. Furthermore, portions of the charging system can retain their original shape and dimensions and be used with footwear ranging in size from a "child size" to an "adult size". For example, in some embodiments the charging system can be utilized with footwear ranging between U.S. standard sizes 8 and larger. In another embodiment, the charging system could be used with footwear ranging from U.S. standard size 4 and 20. In one embodiment, the charging system could be used with footwear ranging from U.S. standard child size 5 to a men's size 21 or larger.

Furthermore, the embodiments described herein may also include or refer to techniques, concepts, features, elements, methods, and/or components from U.S. Patent Publication Number 2016-0345679-A1, published Dec. 1, 2016, patent application Ser. No. 14/723,972, filed May 28, 2015), titled "An Article of Footwear and a Method of Assembly of the Article of Footwear," U.S. Patent Publication Number 2016-0345653-A1, published Dec. 1, 2016, (previously U.S. patent application Ser. No. 14/723,832, filed May 28, 2015), titled "A Lockout Feature for a Control Device," issued Jul. 3, 2018 as U.S. Pat. No. 10,010,129; U.S. Patent Publication Number 2016-0345371-A1, published Dec. 1, 2016, (previously U.S. patent application Ser. No. 14/723,994, filed May 28, 2015), titled "A Sole Plate for an Article of Footwear," issued on Feb. 20, 2018 as U.S. Pat. No. 9,894,954; and U.S. Patent Publication Number 2016-0345655-A1, published Dec. 1, 2016, (previously U.S. patent application Ser. No. 14/724,007, filed May 28, 2015), titled "A Control Device for an Article of Footwear," issued on Sep. 11, 2018 as U.S. Pat. No. 10,070,681; and the entirety of each application being herein incorporated by reference.

While various embodiments have been described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

What is claimed is:

1. A wireless charging system for an article of footwear including an internal inductive loop, comprising:
    a container configured to admit, fully enclose, and secure the article of footwear therein;
    a power source;
    a charging device, operatively coupled to the power source, comprising:
        an external inductive loop; and
        a housing, in which the internal inductive loop is positioned, configured to engage with a cavity in the sole of the article of footwear to secure the internal inductive loop of the article of footwear in a predetermined alignment with the external inductive loop;
wherein the charging device is positioned within the container such that upon placement of the article of footwear within the container the container engages with the article of footwear to bring the internal inductive loop in alignment with the external inductive loop to allow the external inductive loop to induce a current in the internal inductive loop.

2. The wireless charging system of claim 1, wherein the charging device is positioned on a bottom surface of the container.

3. The wireless charging system of claim 2, wherein a first portion of the housing has a first thickness and a second portion of the housing has a second thickness greater than the first thickness, and wherein the housing is configured to secure the article of footwear proximate the first portion.

4. The wireless charging system of claim 3, wherein the housing is configured to bring the article of footwear in contact with a surface of the first portion.

5. The wireless charging system of claim 4, wherein the housing is further configured to bring the article of footwear in contact with a side surface between the first portion and the second portion.

6. The wireless charging system of claim 1, wherein the charging device is configured to secure the article of footwear within the container.

7. The wireless charging system of claim 6, wherein the charging device is a first charging device and the article of footwear is one of a pair of articles of footwear, and further comprising a second charging device positioned in the container to secure a second article of footwear of the pair of articles of footwear within the container.

8. The wireless charging system of claim 7, wherein the second charging device is positioned within the container to secure the second article of footwear parallel with respect to the first article of footwear.

9. The wireless charging system of claim 1, wherein the power source is configured to be coupled to an external power source to provide power to the power source.

10. The wireless charging system of claim 9, wherein the power source is configured to be plugged into the external power source.

11. A method of making a wireless charging system for an article of footwear including an internal inductive loop, the method comprising:
obtaining a container configured to admit, fully enclose, and secure the article of footwear therein;
securing a charging device to the container, the charging device comprising:
an external inductive loop; and
a housing, in which the internal inductive loop is positioned, configured to engage with a cavity in the sole of the article of footwear to secure the internal inductive loop of the article of footwear in a predetermined alignment with the external inductive loop;
operatively coupling to the charging device to the power source,
wherein the charging device is positioned within the container such that upon placement of the article of footwear within the container the enclosure engages with the article of footwear to bring the internal inductive loop in alignment with the external inductive loop to allow the external inductive loop to induce a current in the internal inductive loop.

12. The method of claim 11, wherein securing the charging device includes positioning the charging device on a bottom surface of the container.

13. The method of claim 12, further comprising forming the housing with a first portion of the housing having a first thickness and a second portion of the housing having a second thickness greater than the first thickness, and wherein the housing is configured to secure the article of footwear proximate the first portion.

14. The method of claim 13, wherein forming the housing includes configuring the enclosure to bring the article of footwear in contact with a surface of the first portion.

15. The method of claim 14, wherein forming the housing further includes configuring the housing to bring the article of footwear in contact with a side surface between the first portion and the second portion.

16. The method of claim 11, wherein the charging device is configured to secure the article of footwear within the container.

17. The method of claim 16, wherein the charging device is a first charging device and the article of footwear is one of a pair of articles of footwear, and further comprising securing a second charging device in the container to secure a second article of footwear of the pair of articles of footwear within the container.

18. The method of claim 17, wherein securing the second charging device includes positioning the second charging device within the container to secure the second article of footwear parallel with respect to the first article of footwear.

19. The method of claim 11, wherein the power source is configured to be coupled to an external power source to provide power to the power source.

20. The method of claim 19, wherein the power source is configured to be plugged into the external power source.

* * * * *